Dec. 21, 1965  H. CHESTNUT ETAL  3,225,179
PREDICTIVE CONTROL SYSTEM
Filed Feb. 2, 1962  8 Sheets-Sheet 1

Inventors:
Harold Chestnut,
Paul H. Troutman,
William E. Sollecito,
by Charles W. Helzer
Their Attorney.

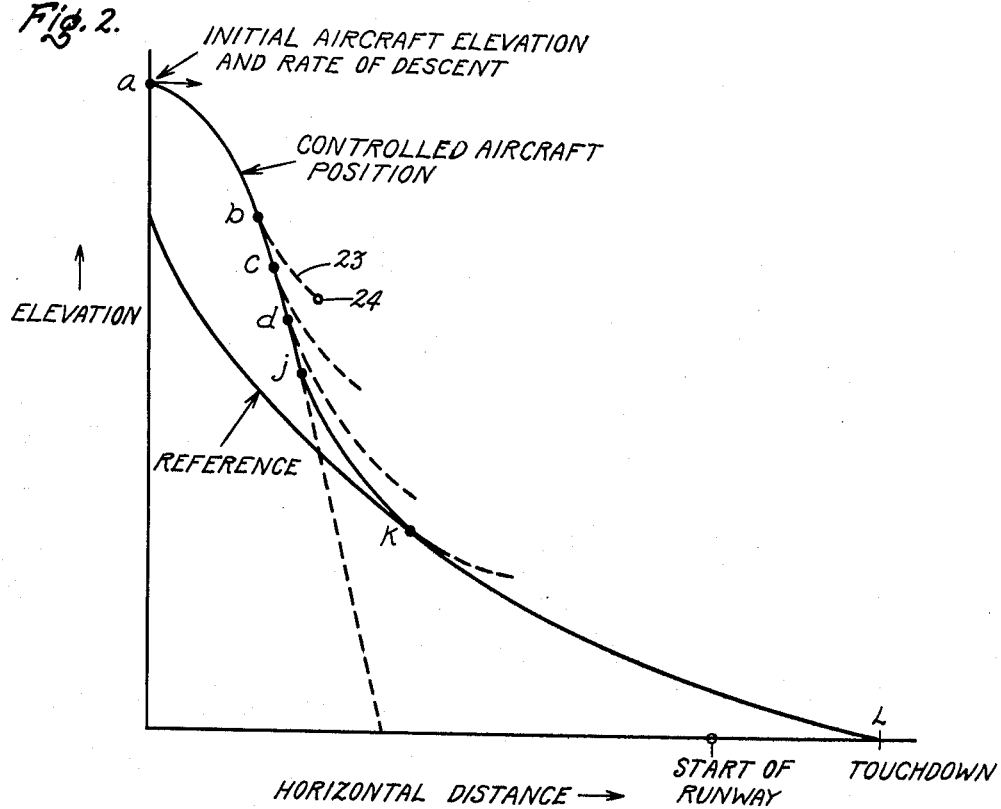
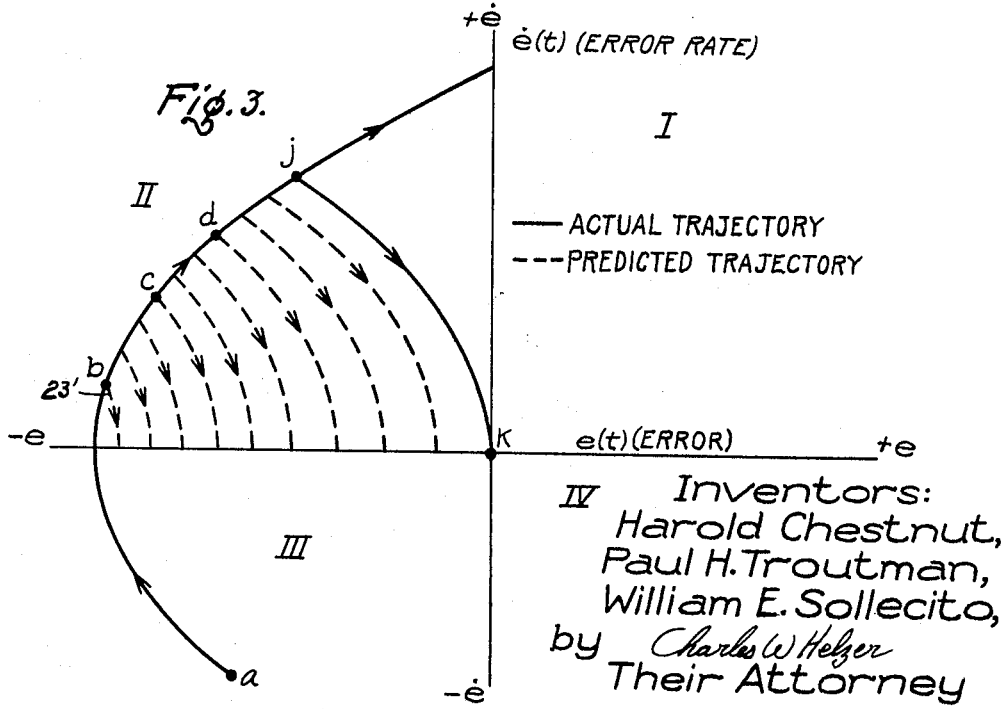

Fig. 6.

Inventors:
Harold Chestnut,
Paul H. Troutman,
William E. Sollecito,
by Charles W. Helzer
Their Attorney.

Inventors:
Harold Chestnut,
Paul H. Troutman,
William E. Sollecito,
by Charles W. Helzer
Their Attorney.

Dec. 21, 1965  H. CHESTNUT ETAL  3,225,179
PREDICTIVE CONTROL SYSTEM
Filed Feb. 2, 1962  8 Sheets-Sheet 8

Inventors:
Harold Chestnut,
Paul H. Troutman,
William E. Sollecito,
by Charles W Helzer
Their Attorney.

United States Patent Office 3,225,179
Patented Dec. 21, 1965

3,225,179
PREDICTIVE CONTROL SYSTEM
Harold Chestnut, Paul H. Troutman, and William E. Sollecito, Schenectady, N.Y., assignors to General Electric Company, a corporation of New York
Filed Feb. 2, 1962, Ser. No. 170,587
16 Claims. (Cl. 235—151)

The present invention relates to a new and improved predictive control system. More particularly, the invention relates to a control system of the type which is predictive in nature in that it derives values representing the predicted future output and future rate or acceleration of a controlled device, and compares these values to predicted future reference values at a selected future point in time to develop an error signal that is used to control the present operation of the controlled device.

The predictive control systems which are presently available in the art for the most part develop predicted error signals representative of predicted errors in output as represented by the position and rate as represented by the velocity of a controlled device at preselected fixed intervals of time into the future. Because these predicted errors are for fixed intervals of time into the future, in the eventuality that a desired event occurs at a point in time between the prediction intervals, then the possibility of over-shoot is enhanced with its consequent oscillation of the system around a desired operating condition. Additionally, the existing predictive control systems are of the on-off type, and the predictive control system operates to predict the point in the predicted performance of the controlled device where reversal of the operating conditions must occur for the control device to assume its prescribed condition in an optimum manner. These known predictive control systems for the most part are set up to initiate predictions as to what will happen to the controlled device if the reverse operating condition were applied to the controlled device at a particular fixed future interval of time. For many applications, this is not a practical basis upon which to project future predictions. Further, the known predictive control systems fail to include in their predictive calculations, a compensating factor for the movement of the actual control device during the time required to carry out the predictive calculations.

It is, therefore, a primary object of the present invention to provide a new and improved predictive control system which bases its prediction intervals on the predicted future error rate passing through zero.

Another object of the invention is to provide a new and improved predictive control system where the predictions are always in the direction to reduce the predicted future error rate towards zero.

A still further object of the invention is to provide a new and improved predictive control system wherein the future predictions are compensated to allow for movement of the actual controlled device during the time required to carry out the predictive calculations.

In practicing the invention, a predictive control system for a variable position controlled device is provided. This predictive control system comprises means for applying an actuating signal to a variable controlled device for controlling its output as represented by the position and rate (or velocity) of the controlled device. A fast-time model of the controlled device which has characteristics substantially similar to the characteristics of the controlled device but which operates on a fast-time basis is also provided. Control means inter-connect the actuation signal means to the controlled device and to the fast-time model. First prediction circuit means are included in the fast-time model for developing signals representing the predicted future values for the output as represented by the position of the controlled device, and the rate as represented by the velocity of the controlled device at some interval of time in the future. Reference signal generating means are provided in the system for developing a reference signal representing the desired position with respect to time of the controlled device, and reference signal prediction circuit means are coupled to the reference signal generating means for developing signals on a fast-time basis which represent the predicted future values for the reference position and the reference velocity at some interval of time in the future. Control logic means are coupled to the outputs of both the first prediction circuit means and the reference prediction circuit means, and to the input of the control means for comparing the predicted future values of the position of the control device and the reference position, and the predicted future values of the velocity of the control device and the reference velocity; and deriving an output signal representative of the future error and the future error rate for controlling the operation of the control means.

The system includes resetting means which are operatively coupled to the first prediction circuit means for resetting the predictive operation of the prediction circuit means each time the predicted error rate reaches zero to thereby initiate a new prediction based on the new present state conditions of the controlled device. In a preferred embodiment of the invention, the control logic means of the predictive control system includes means for sensing a change in polarity of the predicted future error and means for actuating the control means at the point in the actual position of the controlled device where the predicted future error reversed polarity, together with means for reactuating the resetting means subsequent to the control means being actuated to thereby initiate a new prediction based on the new present state conditions of the controlled device with the new prediction being in a direction to reduce the predicted future error rate towards zero. It is also preferred that the fast-time model employed in the predictive control system be compensated in its speed of response to allow for movement of the actual variable controlled device during the prediction period. Additionally, in reading the following description, it should be kept in mind that although the description is directed towards a predictive control system applied specifically to the control of the position and velocity of a controlled vehicle, the invention is in no way limited to such application. The new and improved predictive control system comprising the present invention may be applied to the control of manufacturing processes, operation of a machine tool and other applications where an end condition is desired. Accordingly, it is readily possible to substitute in the present description an end condition for the output of the system in place of position and the rate of assuming the condition for the velocity. Other substitutions to adapt the system for use in a particular application are believed to be equally obvious.

Other objects, features, and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIGURE 2 is a characteristic curve showing a plot of elevation versus horizontal distance of an automatic landing system for aircraft which employs the predictive control shown in FIGURE 1;

FIGURE 3 is an error phase plane plotting the error versus error-rate of an automatic aircraft landing predictive control system whose elevation versus horizontal distance characteristic is illustated in FIGURE 2;

FIGURE 6 is a detailed schematic circuit diagram of the predictive control system shown in FIGURES 1 and 5;

Figure 1:
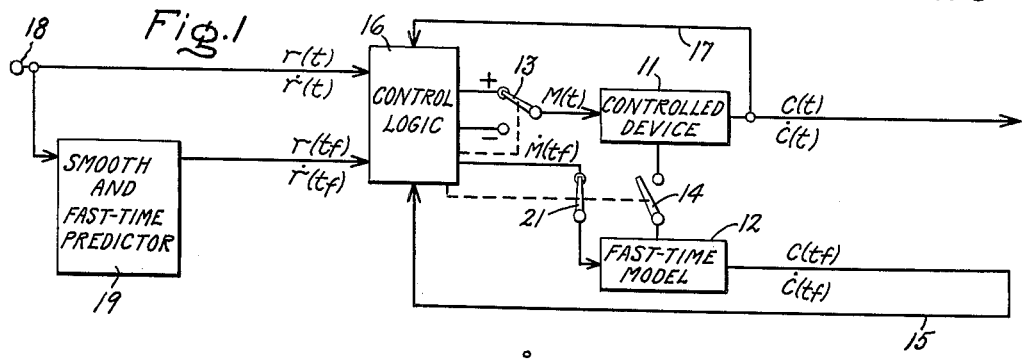
FIGURE 1 is a functional block diagram of an analog version of a new and improved predictive control system constructed in accordance with the present invention.

A new and improved predictive control system constructed in accordance with the invention is shown in FIGURE 1 of the drawings. In FIGURE 1, the controlled device which it is desired to control is shown at 11. The new and improved predictive control system is particularly well suited for use with dynamic problems such as the landing of an aircraft, the control of a batch process, or the synchronizing of position or speed to a known reference position or speed where the characteristics of the control device are subject to some nonlinear variation. Hence, the controlled device 11 may comprise an aircraft, a manufacturing process, a machine tool, or other similar device; however, in the specific system being described, the controlled device 11 may be considered to comprise an aircraft, and that the new and improved predictive control system will be used for automatic landing purposes. The system is further comprised by a fast-time model 12 of the variable position controlled device 11 which has characteristics substantially similar to the characteristics of the variable position controlled device 11, but operates on a fast-time basis. The fast-time model 12 preferably comprises either an analog or digital computer simulation of the controlled device 11. Control means are provided which comprise at least in part a selector switch 13 and a selector switch 21. This control means is provided for applying a positioning signal in the form of an actuating torque $M(t)$ either as a positive polarity signal $+M(t)$, or a negative polarity signal $-M(t)$. This actuating torque signal $\pm M(t)$ is supplied directly to the variable controlled device 11 through switch 13 and as a trial actuating torque to the fast-time model 12 through switch 21 to control the operation of these devices. The fast-time model 12 includes a prediction circuit means, not shown, in the block diagram of FIGURE 1, which operate on a fast-time basis to develop signals representing the predicted future values for the position of the controlled device and the velocity of the controlled device at some point in time in the future the predicted future values being based on the current values of position and velocity of the controlled device. These fast time predicted future values are supplied back through a feedback connection 15 to a control logic means 16 which controls operation of the control switching means 13 and 21. The control logic means 16 also has signals supplied thereto through a feedback connection 17 from the output of the variable controlled device 11 which represent the present position and present velocity of the controlled device 11. In addition to these signals, a reference signal generator shown at 18 serves to develop a reference signal which represents the desired position with respect to time of the variable position controlled device 11, and which is supplied to the control logic means 16. That is, the reference signal may for example increase or decrease with respect to time in such relation to movement of the controlled device that its value at all times corresponds to, or represents, the desired instant position of the controlled device at any particular point in time. The output from this reference signal generator also is supplied through a reference signal prediction circuit means 19 which operates on a fast-time basis to develop signals representing the predicted future values for the reference position signal and the reference velocity signal at some point in time in the future, and these predicted reference signals are supplied to the control logic means 16. The control logic means 16 functions to compare the fast time predicted future values of the position of the controlled device and the reference position, and the future values of the velocity of the controlled device and the reference velocity, and derives an output signal representative of the future error and the future error-rate for controlling the operation of the control means represented by the selector switches 13, 14, and 21. The control logic means 16 as represented in the block diagram of FIGURE 1 also includes a resetting means represented by a selector switch 14 which is operatively coupled from the controlled device 11 to the fast-time model 12. This resetting means operates to reset the predictive operation of the prediction circuit means included in the fast-time model 12 each time that the predicted error rate reaches zero to thereby initiate a new prediction cycle based on the new present state condition of the controlled device 11.

In the specific system being described, the actual controlled device 11 is a simple second order system which is subjected to an actuating torque of either $+M(t)$ or $-M(t)$, depending upon the decision of the control logic 16 this actuating torque being represented by signals supplied through the switch 13. Since the sign of the torque M can change rapidly, and since the rate of change of the position controlled device 11 will change correspondingly with changes in the polarity of the applied torque $\pm M(t)$, the fast-time model system is employed to predict the future values of the position and velocity of the controlled device 11 at some future point in time. The use of the prediction permits the optimum application of the "on-off" or "bang-bang" actuating torque $\pm M(t)$ for the position controlled device, and assures that the proper polarity torque $\pm M(t)$ will be applied at an optimum time. As a result, the control can achieve greater correction in shorter periods of time than control systems heretofore available. Using the present value $C(t_n)$ for the present position of the actual controlled device 11, and the present velocity or rate $\dot{C}(t_n)$, the future values are predicted on a fast-time basis for the position $C(t_n+t_f)$ of the position controlled device 11 and its rate of change or velocity $\dot{C}(t_n+t_f)$. In order to obtain future values for the reference, the present value of the reference $R(t_n)$ is smoothed to obtain its rate of change, and on the same fast-time basis used for the actual controlled device, the future values of the reference $R(t_n+t_f)$ as well as its rate of change $\dot{R}(t_n+t_f)$ are computed for some interval time in the future. The control logic means will then consider the predicted values $$[R(t_n+t_f)-C(t_n+t_f)]$$

and $$[\dot{R}(t_n+t_f)-\dot{C}(t_n+t_f)]$$

on a fast-time basis for discrete values of time into the future $t_f$ and determines whether the torque $+M$ or $-M$ should be applied at the particular point in the trajectory of the controlled device 11 where the prediction was initiated.

As stated earlier, the fast-time model 12 may comprise either an analog or digital computer simulation of the position controlled device 11. For the aircraft landing system described in the application, it was assumed that the position controlled device 11 could be simulated by a simple second order system having an inertia $J$ and a viscous friction $D$, and an applied torque $\pm M$ as described by the equation $$\pm M = Js^2 C + DsC \qquad (1)$$

Experience has indicated that an exact model of the variable control device is not necessary, and that a simpler second order system having equivalent time constants may be used with considerable effectiveness. Letting the velocity of the variable position controlled device 11 represent $V=\dot{C}=sC$, and dividing through by $D$, Equation (1) becomes $$\pm V_M = T_M sV + V \qquad (2)$$

where $$\frac{M}{D} = V_M \text{ and } \frac{J}{D} = T_M$$

From one instant when $+V_M$ or $-V_M$ is applied to the next when a similar decision is made, Equation (2) describes open-loop operation so that it is possible to express $\dot{C}=V$ in terms of the initial condition of velocity $V_N$ at the present time and the parameters $V_M$ and $T_M$. Hence, $$V = V_N + (\pm V_M - V_N)(1-e^{-t'/T_M})$$

or $$V = \pm V_M - (\pm V_M - V_N)e^{-t'/T_M} \qquad (3)$$

where $t'$ is time measured from the present.

Integrating $V$ to get $C$, the position of the variable position control device, one must include the initial position at the present instant $C_N$ to obtain the equation $$C = \pm V_M t' - T_M(\pm V_M - V_N)(1-e^{-t'/T_M}) + C_N \qquad (4)$$

Using the present value of the position controlled device $C_N$ for the value of $C$, and the present value of the controlled device velocity for the value of $V_N$, one can evaluate the values of $V$ and $C$ from Equations 3 and 4 for future instants of time.

The performance of the variable position controlled device described by Equations 3 and 4 is used in two ways. First, it is used to determine the actual performance of the position controlled device 11 from decision interval to decision interval, and for this purpose, the actual values of $V_M$, $T_M$, $C_N$, and $V_N$ are used. Secondly, it is used by the control logic means at each decision interval to predict the performance of the position controlled device 11 to establish whether or not $\pm M$ and hence $\pm V_M$ should be employed for the next decision interval. For this purpose, the actual value of $C_N$ is used, but the model parameters and the model computed velocity are employed. Since the model parameters need not be the same as the parameters of the position controlled device, the computed model velocity, likewise, will not be the same as the actual position controlled device velocity. Since Equations 1 through 4 are relatively simple second order equations, it is not believed necessary to disclose in detail the circuit configuration of the analog computer or the programming required to program a digital computer in order to accomplish simulation of the position controlled device 11 by the fast-time model 12. Accordingly, for the remainder of the disclosure, it will be assumed that the fast-time model 12 will function in accordance with Equations 1 through 4 to provide output signals representative of the predicted future velocity and predicted future position at selected points in time in the future.

The manner of operation of the new and improved predictive control system shown in FIGURE 1 can be better understood in conjunction with FIGURES 2 and 3 of the drawings. FIGURE 2 is a projection of the path of an aircraft whose landing is being controlled automatically by the predictive control system, and shows the relation of this landing path with respect to a reference glide-path. In FIGURE 2, elevation of the aircraft is plotted as the ordinate, and horizontal distance from a touch-down point L on a runway is plotted as the abscissa. At some horizontal distance from the end of the runway or touch-down point L, a radio beacon, radar signal, light beam, or some other means for communicating intelligence starts the reference signal generator carried by the airplane running with respect to time so that it would generate an output electrical signal which would be the electrical equivalent to the reference glide-path indicated in FIGURE 2 i.e., the output electric signal varies with time in such a way that at each instant of time the signal represents a finite position on the prescribed glide path. If at this point, the aircraft is at point $(a)$ having a velocity indicated by the vector at point $(a)$, then it can be readily seen that the aircraft will be higher than the reference glide path at the particular point in question, and further that the aircraft, while it will have a negative velocity component (or deceleration), this negative velocity component is less than the negative velocity component of the reference, so that the path of the aircraft (if the initial conditions are continued) would not meet with the reference glide-path. This can also be seen from an examination of the expression which depicts the operation of the control logic means; namely, $$e(t) = [R(t_n+t_f) - C(t_n+t_f)] \qquad (5)$$

which derives the position error, and the expression $$\dot{e}(t) = [\dot{R}(t_n+t_f) - \dot{C}(t_n+t_f)] \qquad (6)$$

for the velocity error at this point. Just a cursory examination of expressions (5) and (6) will satisfy one that under the conditions portrayed at point $(a)$ of FIGURE 2 $C(t_n+t_f)$ and $\dot{C}(t_n+t_f)$ exceed the reference terms and will produce a negative error value $e(t)$, as well as a negative error rate $\dot{e}(t)$.

FIGURE 3 of the drawings depicts an error phase plane wherein the position error $e(t)$ of the control system is plotted against the error rate $\dot{e}(t)$, and is a particularly valuable tool in illustrating the mode of operation of a non-linear control system such as that comprising the present invention. In FIGURE 3, the point $(a)$ is plotted as a result of the computation carried out in connection with expressions (5) and (6), and as indicated above, since the position at point ($a$) is such it will have both a negative position error value $e(t)$ and a negative error rate $\dot{e}(t)$, the plot on the error phase plane will fall at some point in the third quadrant as shown in FIGURE 3. Where this condition exists, that is, when there is both a negative error and a negative error rate, then it is clear without requiring prediction that the aircraft must descend at this point in order to intercept the reference glide-path. For this reason, the control system described automatically without involving prediction, will adjust itself to cause the glide-path of the aircraft to close on the reference glide-path. The same situation would be true if the plot of the error and error rate were to fall in the first quadrant since in either the first or third quadrant, no prediction is required to determine what should be done at that particular point in time with the controlled device to cause it to move in a direction to minimize both the position error and the error rate. Accordingly, the control system will have built into it an intelligence which automatically will tell the control means in which direction to go to cause the controlled device to do this without prediction. It is only when the path of the aircraft moves in the second or fourth quadrant of the error phase plane that prediction is required. This fact can be better appreciated by examining FIGURE 2 where at point ($b$) it can be seen that although there is still a negative position error of the plane with respect to the reference glide-path, the plane has a steeper slope at point ($b$) than the reference glide-path so that it will have a positive error rate as will be confirmed by computation with expression (6). Accordingly, at point ($b$) prediction would be appropriate to determine what would happen to the aircraft if the reverse operating condition were applied to it at that instant in time. For this purpose, the fast-time model 12 is used to project a fast-time predicted glide-path for the aircraft starting at point ($b$). The present condition of the aircraft at point ($b$) is read into the fast-time model, the fast-time model computes out a projected course of the aircraft should the sign of the actuating torque $\pm M(t)$ for the aircraft be reversed at point ($b$). Such a course would be projected as indicated along the line 23, and would be carried out until such time that the predicted course becomes parallel to the reference glide-path as indicated at point 24, thereby indicating tangency with reference glide-path. At this point, the velocity of the aircraft and the reference velocity will be equal so the error rate is zero. This situation is portrayed in the error phase plane of FIGURE 3, wherein it is seen that the projected course along the line 23 in FIGURE 2 will eventually reduce the error rate along the line 23' in FIGURE 3 to zero but at the point where the projected path intersects the zero error rate axis there is predicted a quite considerable negative position error in the position of the aircraft with respect to the zero position error axis. This situation can be verified from an examination of FIGURE 2, wherein it can be seen that while the slopes of the projected aircraft course 23 and the reference glide-path are the same at point 24, thereby indicating equal velocities and, hence, zero error rate, the point 24 is considerably above the reference glide-path thereby indicating a negative position error would result if the torque were reversed at point ($b$), and the aircraft would overshoot its touchdown point. This same situation holds true for both points ($c$) and ($d$) where at each point as the projected error rate is reduced to zero, there exists a negative position error. It should also be noted at this time that the frequency of prediction along the actual glide-path of the airplane is a highly important factor. While predictive control systems presently available in the art, base their predictions on fixed time intervals between predictions, the predictive control system of the present invention will re-initiate a new prediction each time the predicted error rate passes through zero. Hence, only the actual time required to carry out the prediction calculations only to a degree necessary to establish that the point on the control device trajectory upon which the prediction was based is not a proper point to reverse operating conditions determines the frequency of the prediction cycles. Hence, a maximum number of predictions will be provided for the operating conditions prevailing, thereby minimizing the possibility of overshoot. As a result of the continuing predictions, the operating conditions of the aircraft will not be disturbed at points ($b$), ($c$), or ($d$), but the aircraft will be allowed to continue along its descent line until it reaches point ($j$). At point ($j$), as can be determined from an examination of the phase plane shown in FIGURE 3, at the point where the predicted error rate passes through zero, the predicted position error is also zero, thereby indicating that at point ($k$) where the velocity of the reference and the predicted velocity of the aircraft are the same, their positions will be the same since both the position error and the error rate will be zero at this point. Accordingly, the system will operate to reverse the polarity of the actuating torque $M(t)$ of the aircraft at point ($j$) so as to cause it to become tangent to or synchronize with the reference glide-path at the point ($k$) as indicated in FIGURE 2.

The heart of the particular control system comprising the present invention is the control logic means. In its simplest form, the control logic means is a means for mechanizing the switching criteria that were suggested in the preceding paragraphs. This procedure is summarized in the logic flow chart shown in FIGURE 4 of the drawings. From this chart, it can be seen that the first step in applying the logic is to compute the present value of the position error $e(t)$ and the error rate $\dot{e}(t)$ from the present values of $R_t$, $\dot{R}_t$, $C_t$ and $\dot{C}_t$. From this computation process, the signs $e(t)$ and $\dot{e}(t)$ are compared to determine whether they are the same or different signs. If the signs of $e(t)$ and $\dot{e}(t)$ are the same, it is obvious that the control variable lies in either the first or third quadrants of the error phase plane, and is therefore moving away from synchronization. On the basic of this comparison alone, the sign of the applied torque is made the same as the sign of the present position error $e(t)$, thereby insuring that the control system will be driven towards synchronization as quickly as possible. It is believed that the choice of polarity of the error $e(t)$ to determine the polarity of the applied torque $M(t)$, is apparent, hence, making a prediction unnecessary at this point. An example of this condition, could be the segment ($a$) through ($b$) shown in FIGURES 2 and 3 of the drawings.

When the signs of the position error $e(t)$ and error rate $\dot{e}(t)$ become different, as when the operation of the control device causes it to move to a point where the plot of the position error $e(t)$ and error rate $\dot{e}(t)$ lies in the second or fourth quadrant of the phase plane shown in FIGURE 3, the control device is then moving towards synchronization. It is when the control device is operating in either of these quadrants of the error phase plane that it is necessary to employ the model system on a fast-time basis to predict the point at which reversal of the polarity of the actuating torque $M(t)$ should occur. If the actuating torque $M(t)$ is switched or reversed at precisely the correct time in the trajectory of the control device, synchronization will occur in the most desirable manner. Hence, the predictive control system comprising the present invention employs the control logic means in a manner to call for repetitive predictions to determine if future synchronization would occur if the polarity of the actuating torque $M(t)$ were switched at the present instant of time. For this information, the fast-time model is employed to predict the future response of the control device on a fast-time basis, and a fast-time scale prediction circuit is used to predict the future values of the reference signal on a fast-time basis, and since both the model system and the reference prediction circuit are synchronized and predict at the same fast-time rate, only a subtraction process is required to determine when the future position error $e(t_f)$ and future error rate $\dot{e}(t_f)$ become equal to zero. The control logic means is designed in such a manner that at the future time $(t_f)$ when the future error rate $\dot{e}(t_f)$ becomes equal to zero, the sign of the future position error $e(t_f)$ is stored and is used as a basis for selecting the sign of the actuating torque $M(t)$ to be used for the next instant of time. If this value of the predicted future position error falls short of synchronizing, then no action is taken and the existing operating conditions, that is, the existing polarity of the sign of the applied torque $M(t)$ is allowed to remain the same. On the other hand, if the future error overshoots synchronization, the polarity of the actuating torque $M(t)$ is immediately switched. Hence, it can be appreciated that switching action will occur properly if the polarity of the actuating torque $M(t)$ is made the same as the future position error evaluated at the time that the future error rate equals zero. Examples of this type of operation are illustrated in FIGURES 2 and 3 wherein it can be seen at points $(b)$, $(c)$, and $(d)$ evaluation of the future position error at the time that the future error rate is reduced to zero indicates the points are not the proper ones for reversal of the polarity of the actuating torque. It is only when the control device reaches point $(j)$ in its trajectory that an actual reversal of the polarity of the predicted future position error $e(t_f)$ occurs, thereby indicating that reversal of the polarity of the actuating torque $M(t)$ is proper at that point. Upon the control device reaching point $(k)$, it can be seen that both the position error $e(t)$ and error rate $\dot{e}(t)$ of the control device are zero, thereby indicating that synchronization will occur as can be confirmed by an examination of FIGURE 2 of the drawings.

*Analog predictive control system*

Figure 4:
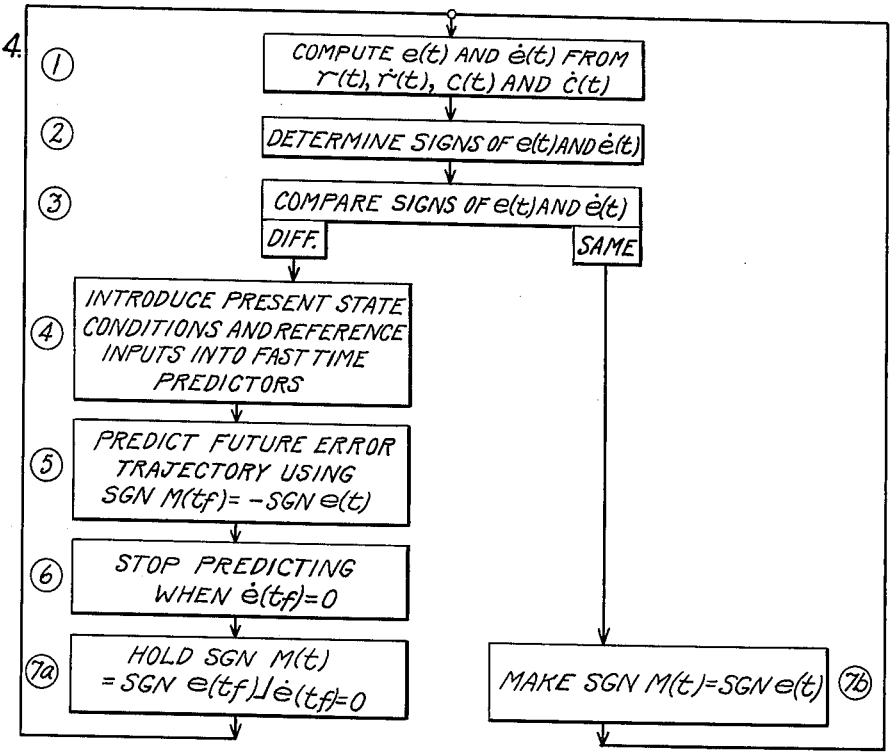
FIGURE 4 is a logic flow-chart of the control logic employed in the predictive control system shown in FIGURE 1.
Figure 5:
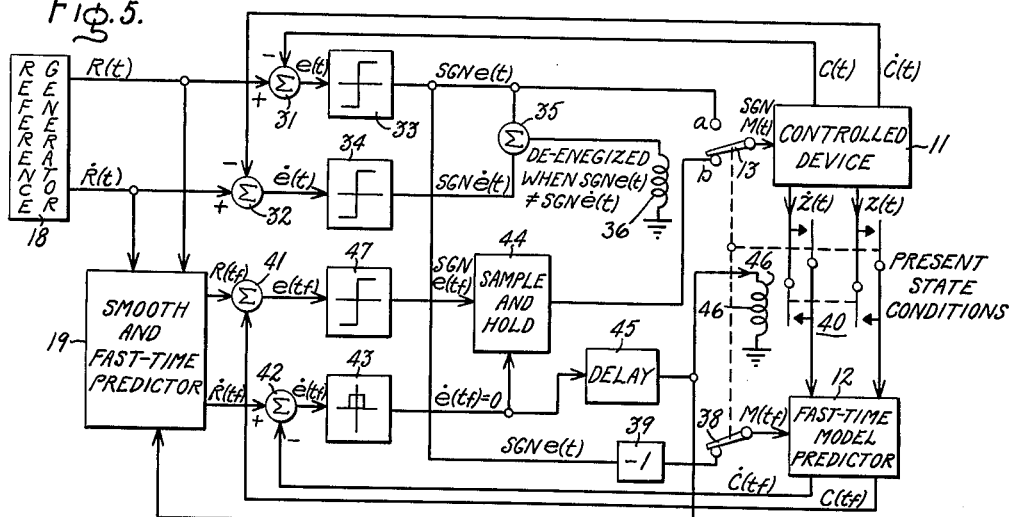
FIGURE 5 is a more detailed functional block diagram of the predictive control system shown in FIGURE 1.

The logical processes performed by the logic control means can be carried out with a digital computer in which event the computer program is very similar to the logic flow-chart shown in FIGURE 4 of the drawings. The circuitry for an analog computer control logic means is not so obvious from the flow-chart and therefore is shown in more detail in FIGURES 5 and 6 of the drawings. By comparing FIGURES 4 and 5 of the drawings, it can be appreciated that the circuit arrangement of FIGURE 5 performs the logic described in the logic flow-chart of FIGURE 4. For example, amplifier 31 serves to subtract the present position $C(t)$ of the control device 11 from the value of the reference $R(t)$ at the present instant and to derive the present position error $e(t)$. The amplifier 32 serves to subtract the value $\dot{C}(t)$ of the present velocity of the controlled device 11 from the value of the present velocity of the reference $\dot{R}(t)$, and to derive the present value of the error rate $\dot{e}(t)$. These two signals are then supplied through polarity sensing circuits 33 and 34, respectively, which derive output signals having either a positive or negative polarity depending upon the polarity of the present position error $e(t)$ and present error rate $\dot{e}(t)$. A summing amplifier 35 serves to compare these two signals, and if they have the same polarity, the sum of the two signals is supplied through an actuating coil 36 to cause the selector switch 13 to be closed on its $(a)$ terminal, thereby applying as a polarity control signal for controlling the polarity of the actuating torque $\pm M(t)$ supplied to the controlled device 11, the polarity of the present error signal $e(t)$. From a consideration of the error phase plane shown in FIGURE 3, it can be appreciated that no prediction is required when polarity of the present error $e(t)$ and present error rate $\dot{e}(t)$ are the same, since it is obvious that either a positive polarity or negative polarity actuating torque $M(t)$ must be applied to the controlled device 11 at any point in the first or third quadrants, depending upon the polarity of the present position error as discussed above. Upon the controlled device 11 being driven to a point where its error plot on the phase plane moves from the first or third quadrants into either the second or fourth quadrants, then the polarity of the error rate $\dot{e}(t)$ will change so that it is different from the position error $e(t)$, as can be determined from FIGURE 3 of the drawings. Upon this occurrence, the signal supplied to the summing amplifier 35 will cancel out so that the holding coil 36 is de-energized, allowing the switching contact 13 to drop down to the contact $(b)$ position as shown in FIGURE 5. Concurrently, the switch contact 38 is closed connecting the fast-time model through a polarity reversing amplifier 39 to the output of the position error polarity sensing amplifier 33. At the same time, a resetting means comprised in part by a sampling switch 40 reads into the fast-time model 12, the present position and velocity of the controlled device 11. The prediction circuit means in the fast-time model 12 will then function to develop output signals representative of the value of the predicted future position $C(t_f)$ and the predicted future velocity $\dot{C}(t_f)$, which output signals are supplied to summing amplifiers 41 and 42, respectively. The summing amplifiers 41 and 42 also have supplied thereto the predicted future values of the reference position $R(t_f)$ and the reference velocity $\dot{R}(t_f)$ from the smooth and fast-time predictor circuit 19. The summing amplifiers 41 and 42 then function to develop output signals representative of the predicted future position error $e(t_f)$ and the predicted future error rate $\dot{e}(t_f)$. The future error rate signal $\dot{e}(t_f)$ is supplied to a zero sensing circuit indicated at 43 which develops an output signal upon the predicted future error rate $\dot{e}(t_f)$ reaching zero value. The output signal from zero sensing circuit 43 is supplied to a sample and hold circuit 44, and through a delay circuit 45 to an actuating coil 46 for the sampling selector switch 40. The predicted future position error signal $e(t_f)$ is supplied from the output of summing amplifier 41 to the input of a polarity sensing circuit 47 whose output is connected to the sample and hold circuit. In this manner, the polarity of the output signal developed by the polarity sensing circuit 47 is sampled and held by the sample and hold circuit 47 each time the predicted future error rate signal $\dot{e}(t_f)$ passes through zero, and this signal is supplied to the contact $(b)$ of selector switch 13. The polarity signal of $e(t_f)$ is then maintained on the contact $(b)$ of selector switch 13 by the sample and hold circuit 47 until the next prediction is performed by the fast-time model predictor 12. After a preselected period determined by the value of the delay 45, the output signal developed by the circuit 43 in response to the error rate dropping to zero will actuate the coil 46, and results in closing sampling switch 40 to thereby read into the fast-time model predictor 12 the new present state condition of the control device 11. The same process is then followed through to again sample the polarity of the predicted future position error signal $e(t_f)$ for the new present state conditions of the control device 11, and this process is carried out after each time that the predicted future error rate signal $\dot{e}(t_f)$ passes through zero. It is believed obvious that upon the position controlled device 11 reaching a position such as position $(j)$ as shown in FIGURE 2 of the drawing, the polarity of the signals supplied through the sample and hold circuit 44 to contact $(b)$ will be reversed due to the polarity reversal of the predicted future position error signal. Upon this occasion, the polarity of the actuating torque $M(t)$ supplied to the controlled device 11 will be reversed to cause the controlled device to come in along the predicted path $(j)-(k)$ as illustrated in FIGURE 2.

Figure 6:
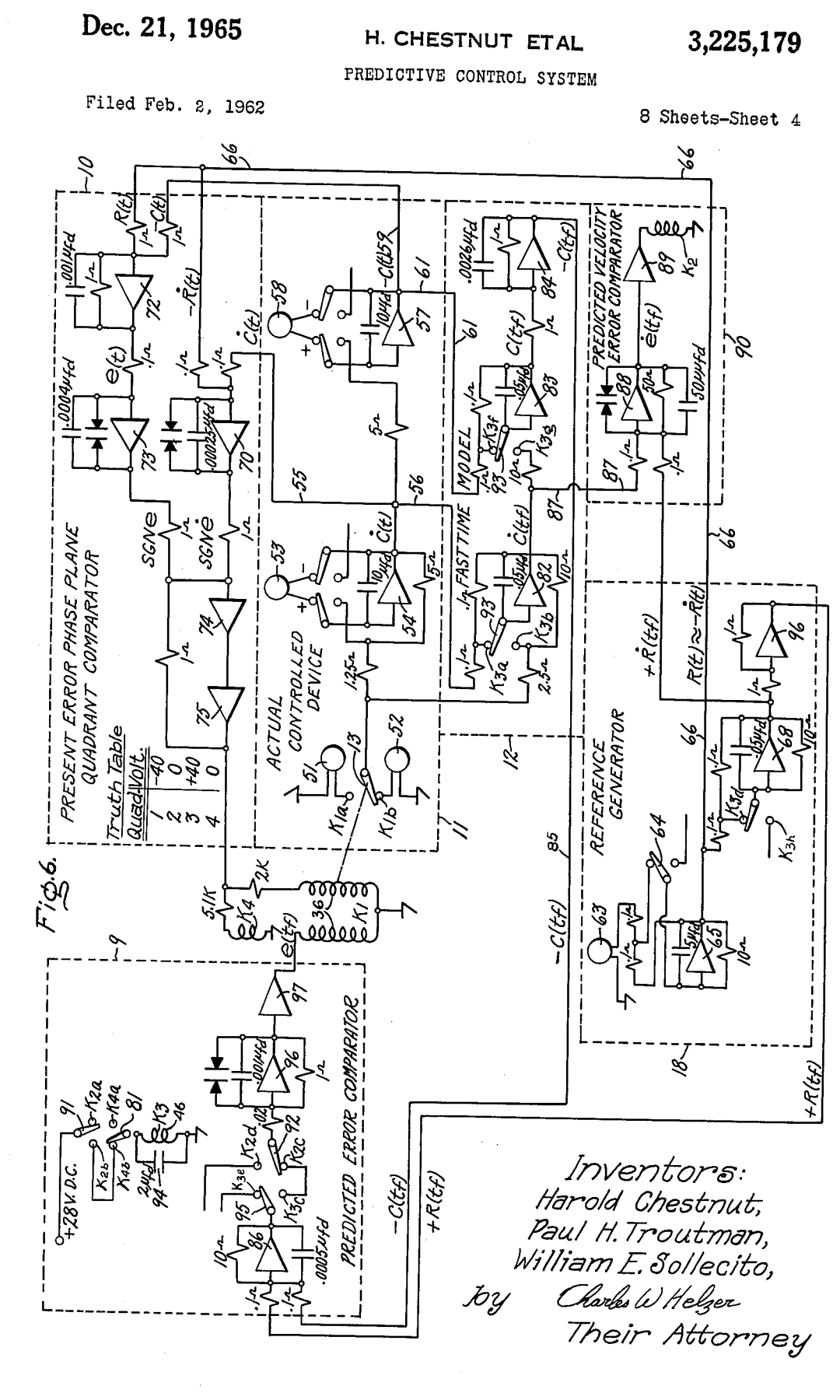

*Detailed analog predictive control system of FIGURE 6*

FIGURE 6 shows the detailed schematic diagram of the analog form of predictive control system constructed in accordance with the invention. In FIGURE 6 the actual controlled device is illustrated as being contained within the dotted outline box marked 11. Since the actual controlled device can comprise an aircraft, machine tool, or any other equivalent process or device, it has not been illustrated bodily and only the important functional parts of the device are shown. It is assumed, however, that the device being operated is of the on-off type, that is, it has full power in one direction and either no power or power applied in a reverse direction. One specific example might be the actuating mechanisms for the elevator of an aircraft to cause it to dive or to gain altitude. If it is assumed that the elevators of an aircraft are being operated, then the motors for operating the elevators will be controlled by control switch arm 13. The motors for operating the elevators to drive the aircraft in a minus (—) or down direction and are considered to be the actuating torque $-M(t)$, and are mechanically coupled to drive a potentiometer 51 that derives a control signal having a polarity representing the actuating torque $-M(t)$. The motor for operating the elevators to drive the aircraft in an up direction are considered to be the positive (+) actuating torque $+M(t)$, and are similarly coupled to a potentiometer 52 that derives a control signal having a polarity representing the actuating torque $+M(t)$. By this arrangement, a negative polarity potential will appear at the switch contact $K_{1a}$ representing the negative actuating torque $-M(t)$, and a positive polarity potential appears at switch contact $K_{1b}$ representing the positive actuating torque $+M(t)$. Hence, depending upon which way the switch contact arm 13 is thrown either $K_{1a}$ or $K_{1b}$ will be closed to cause the associated motors of the potentiometers 51 or 52 to drive the elevators of the aircraft to cause it to move in either an up or down direction, and concurrently a control signal appears on the contact which is representative of the polarity of the applied actuating torque $\pm M(t)$. In operating the controlled device it is necessary to derive measurements of its present position and present velocity assuming that only a second order system is involved, and it should be understood that higher order systems can be controlled in accordance with the teachings of the present invention. For this purpose, a speedometer, tachometer, or other similar device is indicated at 53 for developing an output signal representative of the present velocity of the controlled device. This output signal is supplied to the input of a conventional direct current amplifier 54 of the type described in the textbook entitled, "Electronic Analog Computers" by Korn and Korn, Second Edition, published by McGraw-Hill Book Company, 1956, page 23. The amplified output signal from amplifier 54 is supplied over conductor 55 to the input of a present error phase plane quadrant comparator circuit 10, and over a conductor 56 to the input of the fast-time model 12. For convenience, the output from signal amplifier 54 representing the present velocity of the actual controlled device will be referred to as $\dot{C}(t)$, and may also be supplied to an amplifier 57 which, when connected in this manner, serves as an integrating amplifier 57 of the type described on page 19 of the above-identified Korn and Korn textbook. Alternating, the amplifier 57 also may have its input coupled through a suitable switching circuit to an odometer, radar, altimeter, or other suitable distance measuring instrument 58. By either arrangement, the amplifier 57 serves to develop at its output terminal, an output signal $C(t)$ representative of the present position of the actual controlled device 11. This output signal $C(t)$ is supplied over the conductor 59 to one input terminal of the present error phase plane quadrant comparator circuit 10, and is supplied over a second conductor 61 to a second input of the fast-time model 12.

The reference generator 18 may comprise a capacitor-resistor discharge circuit 63 that is controlled by a suitable starting switch arrangement 64 that is automatically controlled by a radio beacon radar receiver, etc., for starting the reference generator at a particular point in the flight path. The switch 64 serves to connect the output of the R.C. discharge circuit 63 to the input of an amplifying device 65. The amplifier 65 is of standard construction, and serves to amplify the time varying signal generated by R.C. discharge circuit 63, and to supply this signal over a conductor 66 to each of two inputs of the present error phase plane quadrant comparator circuit 10. This signal $R(t)$ is also supplied through the switch contacts $K_{3d}$ of a relay operated switch to the input of amplifier 68, that operates on a fast-time basis to develop an output signal $R(t_f)$ representative of the predicted future value of the reference signal. The actuating winding of switch contact $K_{3d}$ is shown at $K_3$ in the upper left hand corner of FIGURE 6. When de-energized all of the armatures of the actuating winding $K_3$ including armatures 93 in the fast-time model, and 95 in the predicted error comparator are in their upper positions.

The time varying reference signal $R(t)$ developed by the reference generator and supplied over the conductor 66 is applied to one input of the present error phase plane quadrant comparator 10 along with a signal $C(t)$ representing the present position of the actual controlled device 11. These two signals are applied to the input of a summing amplifier 72 which serves to subtract the position signal $C(t)$ of the actual control device from the signal $R(t)$ representing the reference position and to derive an output signal $e(t)$ representative of the present error as defined by expression (5).

It should be noted at this point that the same signal is supplied over conductor 66 to the input of the present error phase plane quadrant comparator 10 for use as the present value of the position of the reference signal $R(t)$ and for present value of the velocity of the reference $\dot{R}(t)$. This can be done because of the fact that the reference signal $R(t)$ is an exponential, and its derivative is also an exponential signal of the same decay but of opposite polarity and different magnitude, it is possible by amplitude scaling methods such as discussed on page 30 of the above-identified textbook by Korn and Korn that only one amplifier is needed for both $R(t_f)$ and $\dot{R}(t_f)$. Hence, in determining the sign or polarity of these two signals, it is entirely proper to use the signal generated at the output of the amplifier 65 in both instances. It is the function of the present error phase plane quadrant comparator circuit 10 to make an initial determination as to which quadrant of an error phase plane such as that shown in FIGURE 3 of the drawings, the present operating conditions of the actual controlled device 11 would cause a plot of the conditions of that device to be located. For this purpose, all that is required is that the polarity of the two signals representative of the present error $e(t)$ and the present error rate $\dot{e}(t)$, be compared. To accomplish this, the signal representing the present velocity of the actual control device $\dot{C}(t)$ and the present reference velocity $\dot{R}(t)$ are summed together in the summing amplifier 70. Concurrently, signals representative of the present reference position $R(t)$, and the negative of the present position of the actual control device $-C(t)$ are summed together in summing amplifier 72. Summation of these two signals in the amplifier 72 produces an output signal representative of the present error $e(t)$ which is supplied through a polarity sensing amplifier 73 that develops an output signal representative of the polarity or sign of the present error $Sgn\ e(t)$. The signals appearing at the outputs of the amplifiers 70 and 73 are then supplied to the input of a summing amplifier 74 whose output is supplied through a current amplifier 75 to the relay windings $K_1$ and $K_4$. By this arrangement, the summing amplifier 74 serves to sum together the two signals representative of the sign or polarity of the present position error $e(t)$ and the present error rate $\dot{e}(t)$, and to derive an output signal that is used to control the control switch 13, and hence the polarity of the actuating torque $\pm M(t)$ applied to the controlled device 11. The truth table for the present error phase plane quadrant comparator circuit is indicated within the dotted line boundary of the comparator circuit 10. From an examination of this truth table, it can be seen that in the event the actual control device operation conditions are such that its plot would be located in the first quadrant of the error phase plane, the summing amplifiers 74 and 75 would develop an output signal having a value of −40 volts. This signal would operate through the relay winding $K_1$ to cause control switch 13 to close on its contact $K_{1b}$, and causes a positive polarity actuating torque signal $+M(t)$ to be applied to the controlled device 11. This would cause the controlled device 11 to lose altitude thereby resulting in an increase in velocity as well as to decrease the position error immediately without requiring any further computations or predictions. If the conditions are such as to locate the plot of the actual controlled device in the third quadrant of the error phase plane, the output of the summing amplifier 74 and 75 will be a positive 40 volts and will cause the relay winding $K_1$ to move the switching arm 13 to the $K_{1a}$ contact thereby causing a negative polarity actuating $-M(t)$ to be applied to the controlled device 11. Accordingly, it can be seen that if the actual controlled device operating conditions are such as to locate its plot in either the first or third quadrants of the error phase plane, no prediction is performed by the predictive control system but the system will automatically supply the position controlled device with the proper polarity actuating torque $\pm M(t)$ to cause it to reduce both the error and the error rate towards zero. Consequently, in either the first or third quadrants the relay winding $K_4$ will be energized to actuate its armature 81 to the right to interrupt the energizing circuit to the relay winding $K_3$ as shown in the upper left hand corner of FIGURE 6, thereby moving both its armatures 93 in fast-time model 12 to their upper positions into engagements with contacts $K_{3a}$ and assuring that no prediction will take place as long as the actual control device operating conditions are such as to place its plot in either the first or third quadrant of the error phase plane. As can be determined from further examination of the truth table, where the operating conditions of the actual controlled device are such as to cause its plot to be located in either the second or fourth quadrants of the error phase plane, summation in the amplifier 74 will result in the production of a zero output signal which leaves both relay windings $K_1$ and $K_4$ in a de-energized condition; thereby allowing the relay switch 81 in the predicted error comparator circuit 9 to be closed on its de-energized or left hand contact $K_{4b}$, thereby conditioning the circuit of FIGURE 6 to allow it to be placed in its predicting operation condition.

In the event that the actual controlled device 11 is operating in a manner such that its plot on the error phase plane would be located in the second or fourth quadrants, then as indicated in the preceding paragraph, the output signals from the summing amplifiers 74 and 75 would be zero so that the relay windings $K_1$ and $K_4$ would be de-energized. De-energization of the relay winding $K_4$ allows the switching arm 81 of this relay to close on the left hand contact $K_{4b}$, thereby preparing the circuit of FIGURE 6 for energization of the relay winding $K_3$. Simultaneously, the initial conditions of the actual controlled device 11 will be supplied through the conductors 56 and 61 to the fast-time model 12 since both switches 93 are in their upper position when relay winding $K_3$ is deenergized. The signal supplied over conductors 56 represents the present velocity $\dot{C}(t)$ of the actual controlled device 11 and the signal supplied over conductor 61 represents the present position $C(t)$ of the actual controlled device. The signal $\dot{C}(t)$ representing the velocity of the actual controlled device supplied over conductor 56 is applied to the input of an operational amplifier 82 having the transfer function set forth in Equation 1 designed into it and amplifier 82 is adjusted to operate on a fast-time basis so that it develops a signal $\dot{C}(t_f)$ at its output representative of the predicted future value of the velocity of the controlled device 11. Similarly, the signal $C(t)$ representing the present position of the controlled device 11 is supplied over conductor 61 is fed into an operational amplifier 83 having designed into it the transfer function identified in Equation 1 above and adjusted to operate on a fast-time basis. Accordingly, a signal $C(t_f)$ is produced at the output of amplifier 83 which is representative of the predicted future value of the position of the actual controlled device 11. This latter signal has its polarity reversed in a polarity reversing amplifier 84, and the resulting negative polarity signal $-C(t_f)$ representing the negative of predicted future position of the controlled device is supplied over the conductor 85 to a summing amplifier 86 located in the predicted error comparator circuit 9.

The signal $\dot{C}(t_f)$ representing the predicted future value of the velocity as developed by the fast-time model 12 is supplied over a conductor 87 to the input of a summing amplifier 88 of conventional construction located in a predicted velocity error comparator circuit 90. Also supplied to the summing amplifier 88 is the signal $\dot{R}(t_f)$ derived from the output of the reference generator 18 representative of the predicted future value of the reference velocity. This signal is derived from the output of the operational amplifier 68 adjusted to operate on the same fast-time basis as the amplifier 83. As a consequence, the summing amplifier 88 will sum together these two signals in accordance with the expression (6) and supply an output signal $\dot{e}(t_f)$ repesentative of the predicted future error rate. The predicted future error rate signal $\dot{e}(t_f)$ is supplied through a current amplifier 89 to a relay winding $K_2$. It is believed obvious that for so long as the predicted future velocity error signal $\dot{e}(t_f)$ has a finite value, the relay winding $K_2$ will be energized. Energization of the relay winding $K_2$ will cause the switch arm 91 of the relay located in the predicted error circuit 9 to be closed on its contact $K_{2b}$, thereby applying a 28-volt direct current potential to the relay winding $K_3$. Energization of the relay winding $K_3$ will cause the switch arms 93 of the switching contacts located in the fast-time model 12 to be closed on their contact $K_{3b}$, thereby connecting the operational amplifiers 82 and 83 in the fast-time model 12 through control switch 13 to the signals representing the polarity of the applied actuating torque $\pm M(t)$. In this manner, the fast-time model 12 is subjected to a controlling signal applied through switch arm 13 which represents the polarity of the actuating torque $\pm M(t)$. Since the fast-time model operates on a fast-time basis, that is, with this specific example at a speed of over 100 times as fast as the actual controlled device 11, the fast-time model 12 will be driven by the control signal applied through the switch arm 13 to develop output signals which represent the predicted future position $C(t_f)$ and velocity $\dot{C}(t_f)$ of the actual controlled device 11 for as long as the particular polarity of the actuating torque $\pm M(t)$ then being applied through switch arm 13 is maintained.

It should be noted that with the predictive control circuit of FIGURE 6 thus conditioned, the two amplifiers 82 and 83 operate serially in that the operational amplifier 83 integrates the output of the operational amplifier 82.

The predicted future value of the velocity $\dot{C}(t_f)$ of the controlled device 11 and the predicted future value of the velocity of the reference $\dot{R}(t_f)$ are continuously compared in amplifier 88, and the output of the amplifier 88 is supplied through the current amplifier 89 to the relay winding $K_2$. It is assumed that the operating conditions of the controlled device and hence, the model are such that the model is being driven towards a zero error rate. Accordingly, at some instant in the future, the output of the amplifier 88 will reach zero value, and upon this occasion, the relay winding $K_2$ will become deenergized. Upon the relay coil $K_2$ being de-energized, the contact arm 91 of the relay switch contacts located in the predicted error comparator 9 will be shifted to its de-energized position where it is closed on the contacts $K_{2a}$. Concurrently, the switch arm 92 will drop from its energized position to its de-energized position closed on the contact $K_{2c}$. Movement of the switching contact arm 91 to close on the contact $K_{2a}$ will de-energize the relay winding $K_3$. The relay winding $K_3$ has a capacitor 94 connected in parallel with it which delays the discharge of the winding $K_3$ for a predetermined period after deenergization of the winding. Accordingly, for a predetermined period, hereafter referred to as the sampling period, the switch contact 92 will be closed on the contact $K_{2c}$, and the switch contact 95 of the relay winding $K_3$ will be closed on the contact $K_{3c}$, thereby providing a closed circuit connection from the output of the summing amplifier 86 to a current amplifier 96 in the predicted error comparator circuit 9.

As stated previously, the summing amplifier 86 has supplied thereto the predicted future position signal $C(t_f)$ of control device 11 supplied from the output of the current amplifier 84 in the fast-time model 12, and in addition, has supplied thereto the predicted future value of the reference position $R(t_f)$ supplied thereto from the output of the polarity reversing amplifier 96 in the reference generator. The summing amplifier 86 sums together the value of the future reference position $R(t_f)$ and the negative value of the future predicted position of the fast-time model $C(t_f)$, in accordance with expression (6), and supplies an output signal through the switch contacts 95, 92 to a current amplifier 96 which is representative of the predicted future position error $e(t_f)$. The output of the current amplifier 96 is in turn connected through a second current amplifier 97 to one of the relay windings $K_1$ which actuates the control switching contact 13. As a consequence of this arrangement, it can be appreciated that the summing amplifier 86 serves to develop an output signal $e(t_f)$ equal to the predicted future position error at any given instant, and during the sampling period this predicted future position error signal $e(t_f)$ is supplied to the relay winding $K_1$ where it serves to actuate control switch contact 13.

Referring now to FIGURE 3 of the drawings, it can be appreciated that at points (b), (c), and (d) in the trajectory of the control device when the predicted future error rate $\dot{e}(t_f)$ drops to zero so as to de-energize relay winding $K_3$, a sampling period will occur and will result in producing a negative position error signal at the output of the summing amplifier 86 that is supplied to the relay winding $K_1$. Since at points (b), (c), and (d) the predicted future position error $e(t_f)$ is of the same polarity, the relay winding $K_1$ will not cause the contact arm 13 to be changed from its initial operating condition. Accordingly, the initial operating condition that existed when the controlled device trajectory on the error phase plane moved into the second quadrant, the negative polarity actuating torque $-M(t)$ applied to the controlled device will be maintained, and the controlled device will continue along the projected path as shown in FIGURE 3 of the drawings.

It should be noted that after each sampling period, the charge on the capacitor 94 connected in parallel with the relay winding $K_3$ will eventually leak off, allowing the switch arm 95 to open (that is closed on its contact $K_{3c}$) and remove the predicted future position error signal $e(t_f)$ from the relay winding $K_1$. Concurrently with this action, the switch arms 93 in the input of the operational amplifiers 82 and 83 of the fast-time model 12 will be returned to their de-energized position closed on contacts $K_{3a}$ and $K_{3f}$, respectively, due to the fact that relay winding $K_3$ is de-energized. In this position, output signals will be supplied from the actual control device 11 to the operational amplifiers 82 and 83, respectively, which represent the new present values of the position of the actual control device $C(t)$ and velocity of the control device $\dot{C}(t)$. In this manner, the predictive model system is reset for a new cycle of operation each time the predicted future error rate $\dot{e}(t_f)$ passes through zero value. Thereafter, the fast-time model will function to develop signals representing the new predicted future position $C(t_f)$ and new predicted future velocity $\dot{C}(t_f)$, based on the new present state values. The new predicted future velocity signal $\dot{C}(t_f)$ is again supplied to the summing amplifier 88 in conjunction with the predicted future value of the reference velocity $\dot{R}(t_f)$ at this point in time and results in the production of an output signal representative of a new predicted future error rate $\dot{e}(t_f)$. This new predicted error rate signal $\dot{e}(t_f)$ is supplied to the relay winding $K_2$ and the whole cycle is again repeated. Such a cycle of operations will be carried out through the points (b), (c), and (d), of the error phase plane shown in FIGURE 3 of the drawings until such time that the actual control device reaches point (j).

Upon the control device reaching a point in its actual trajectory, such as point (j), then the predicted future position error signal $e(t_f)$ developed at the output of the summing amplifier 86 will change polarity, and will result in changing the polarity of the applied actuating torque $\pm M(t)$ applied to the controlled device. Thereafter, a new prediction cycle is initiated by reading the then new present state conditions of the actual control device into the fast-time model, and carrying out a new prediction with the reversed polarity torque applied. The fast-time model will then operate for the new prediction cycle in a direction to again drive the predicted future error rate $\dot{e}(t_f)$ towards zero so that as the actual controlled device travels down the portion of the phase plane shown in FIGURE 7, and of its trajectory indicated by that portion marked (j)–(k), future predictions of the response of the vehicle will be continued throughout its travel.

Figure 7:
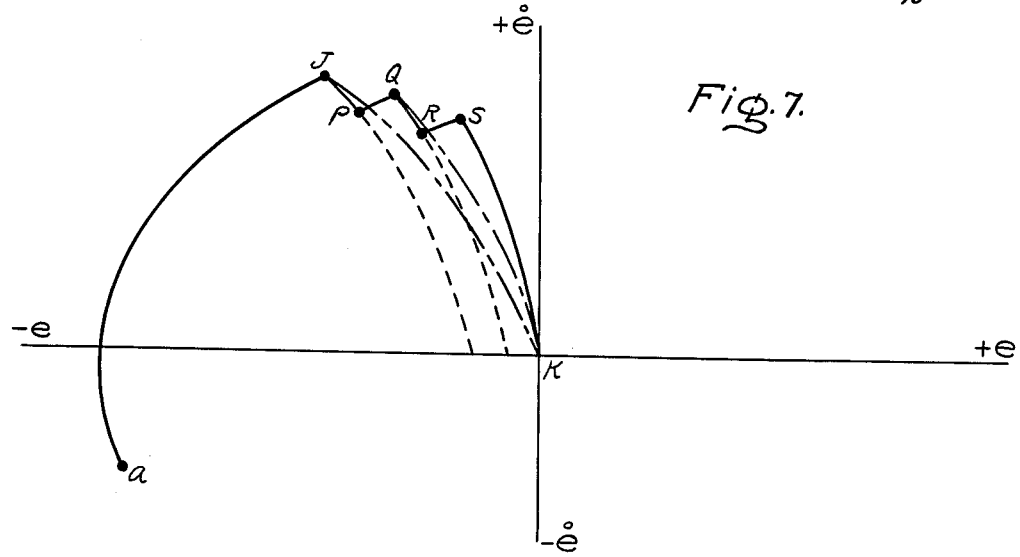
FIGURE 7 is an error phase plane plot of the error versus error-rate for the predictive control system shown in FIGURES 1 and 6 and illustrates one mode of operation of the system.

At the point (j) in the trajectory of the controlled device, after the reversal in polarity of the actuating torque $M(t)$ applied to the controlled device, there are essentially two possible courses for the controlled device to follow. These two possible courses have been plotted in the two error phase planes shown in FIGURES 7 and 8, respectively. In FIGURE 7, it is assumed that the actuating torque $M(t)$ is of the type which is a full power on, or no power at all. Accordingly, if at point (j), the predicted future trajectory is such as that illustrated by the dash-dot line extending between points (j) and (k), a reversal of polarity of the actuating torque $M(t)$ will occur at point (j) so as to move the controlled device 11 towards the point (k) and synchronization. Thereafter, the controlled device may drop down the trajectory path indicated by the portion JP. At point P, however, as can be determined by the dotted path representing the predicted future trajectory, there will be a negative position error if the present operating conditions are maintained. Accordingly, the predictive control system will reverse the polarity of the actuating torque $M(t)$ at point P so as to provide acceleration to the controlled device 11 along the portion of the trajectory PQ. At point Q, as indicated by the dash-dot line, the predicted future position error again indicates a reversal polarity so that the actuating torque is again reversed, allowing the controlled device to drop down along the trajectory path indicated by the portion QR. Again at point R, as indicated by the dotted line, a negative position error is predicted by the model system if the actuating conditions then existing are maintained on the control device. Hence, at point R a reversal of the polarity of the actuating torque $M(t)$ is brought about to provide acceleration to the controlled device to cause it to move along the portion of the trajectory RS. Thereafter, at point S, the predicted future trajectory and the actual trajectory coincide so that coincidence or synchronization occurs at point K as desired, with its resultant zero value in both position error and error rate.

Figure 8:
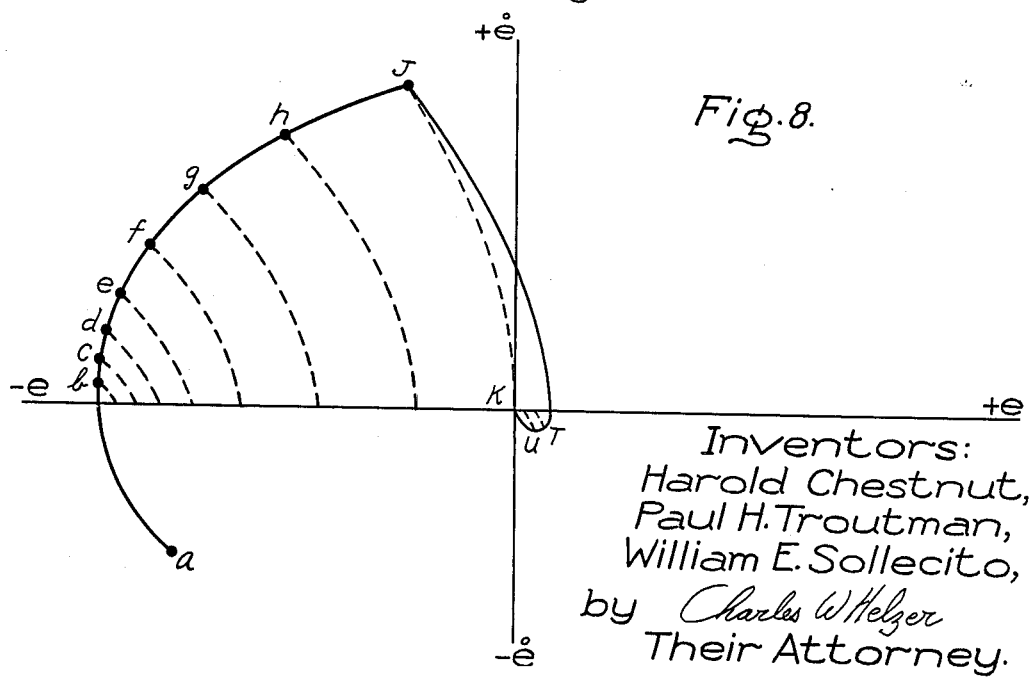
FIGURE 8 is a second error phase plane plot of the error versus error-rate of the predictive control system of FIGURES 1 and 6, and illustrates a second mode of operation of the control system.

A second possible mode of operation of the controlled system is illustrated in FIGURE 8 of the drawings. It is again assumed that the actuating torque $\pm M(t)$ is of the on-off type. If at point $(j)$ where the predicted future trajectory is that indicated by the dotted line, $(j)-(k)$, a reversal of the actuating torque is brought about; then, because it is not possible to accelerate the controlled device in the reverse direction, the device follows a path such as that indicated by the solid line $(j)-(k)$, and overshoot will occur. Where such overshoot does occur so as to cause the plot on the error phase plane to move through the third quadrant and then into the fourth quadrant, as the controlled device oscillates around zero error rate and zero position error condition, the number of predictions will be increased as at points U and T to thereby drive the controlled device into synchronization at point $(k)$ as soon as possible, even though it did tolerate some overshoot from the position of point $(j)$. In all instances, however, it can be appreciated that the direction of the prediction by the model system is always in a direction to reduce the position error to zero; hence, assuring maximum effective utilization of the available actuating torque $M(t)$.

One very desirable feature of the new and improved predictive control system is illustrated effectively in FIGURE 8. In FIGURE 8, it can be seen that in the vicinity of zero error rate; that is, at points such as $(b)$, $(c)$, $(d)$, and $(t)$, $(u)$, and the like, the frequency of predictions is increased due to the fact that the predicted error rate drops to zero value in very short time at such points in contrast to the greater amount of time required at such points as $(g)$, $(h)$, and $(j)$. This is a very desirable feature of the present predictive control system in that it provides a higher sampling or prediction rate in or around the zero error rate vicinity where such higher prediction rates are desirable to provide maximum control.

FIGURE 8 also illustrates effectively the need to provide some compensation for the movement of the controlled device during the period of time required to carry out the prediction calculations. In order to provide for this, the transfer function employed in the design of the operational amplifiers in the model system is adjusted to compensate for movement of the actual device during the prediction period. As a result, reversal of the actuating torque can actually be accomplished at the precise point in the projected future trajectory where it is predicted that optimum synchronization can be accomplished.

Digital predictive control system

Figure 9:
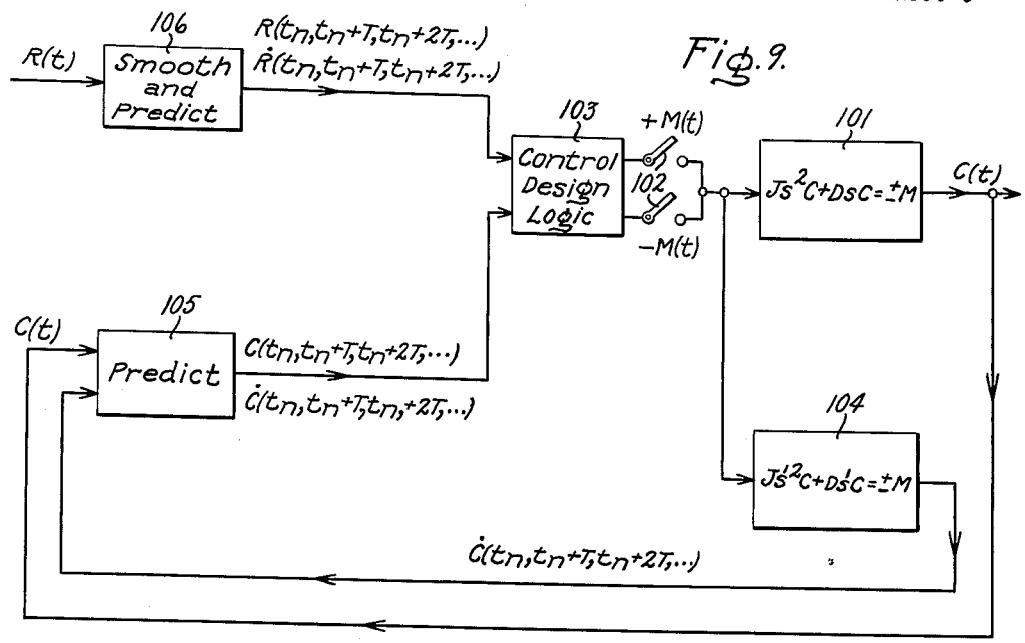
FIGURE 9 is a functional block diagram of a digital version of a new and improved predictive control system constructed in accordance with the present invention which employs on-off control and a digital computer to perform the logic for the system.

A block diagram of a digital version of the new and improved predictive control system constructed in accordance with the invention is shown in FIGURE 9 of the drawings. In FIGURE 9, the position controlled device is shown at 101 and has applied thereto through a control means formed by a pair of switches 102, either a positive actuating torque $+M(t)$ or a negative actuating torque $-M(t)$ depending upon which one of the control switches 102 is closed by a control logic means 103. Connected in parallel with the position controlled device 101 is a fast-time model 104 having characteristics substantially similar to the characteristics of the actual controlled device but adjusted to operate on a fast-time basis. The fast-time model 104 supplies its output signal to a prediction circuit means 105 which also obtains signals from the actual control device 101 as well as from the fast-time model 104, and operates to develop output signals representing the future values of the predicted position $C(t_f)$ and predicted velocity $\dot{C}(t_f)$ of the position control device at sampling intervals of T seconds apart into the future. These predicted future values of position $C(t_f)$ and velocity $\dot{C}(t_f)$ are supplied to the control logic means 103. Also supplied to the control logic means 103 are the predicted values of the future reference position $R(t_f)$ and the reference velocity $\dot{R}(t_f)$ of a reference signal supplied through a smoothing and prediction circuit 106 having its output likewise connected to the control logic means 103. From a comparison of the digital predictive control system shown in FIGURE 9 to the block diagram of the analog predictive control system shown in FIGURE 1, the similarities of the two systems are at once apparent. There are some differences with respect to the mode of sampling, etc., necessitated by the nature of the digital system, which differences will be described more fully hereinafter.

Figure 10:
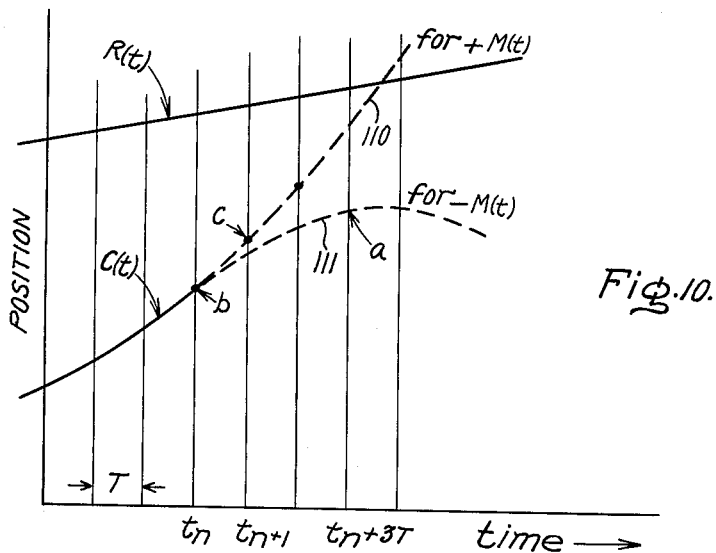
FIGURE 10 is a characteristic curve showing a plot of position versus time of the vehicle predictive control system shown in FIGURE 9.

FIGURE 10 of the drawings illustrates the mode of operation of the new and improved digital predictive control system. In FIGURE 10, the position versus time plot of the trajectory of a position controlled device is shown along with a plot of a reference curve with which synchronization is desired. The time axis of this block is broken into a number of time intervals having a period T. The control logic means of the system shown in FIGURE 9 is used to decide at each decision interval $t_n$, $t_n+1T$, $t_n+2T$, etc., whether a positive polarity actuating torque $+M(t)$ or a negative polarity actuating torque $-M(t)$ should be applied to the position controlled device 101 at that particular point in time. The selection of the proper polarity actuating torque $\pm M(t)$ is determined by the values of the predicted future position error $e(t_f)$ as determined from the expression $[R(t_n+t_f)-C(t_n+t_f)]$, and the predicted future error rate $\dot{e}(t_f)$ as determined from the expression $$[\dot{R}(t_n+t_f)-\dot{C}(t_n+t_f)]$$

If it is assumed that the present time is $t_n$, then using the transfer function shown in expression (1), the predicted curve that will be followed for a positive polarity actuating torque $+M(t)$ is shown at 110, and the predicted trajectory that will be followed if a negative polarity actuating torque $-M(t)$ is applied to the control device is shown at 111. It is to be understood that these predicted trajectories are calculated on a fast-time basis.

*Step #1.*—At time $t_n$ the control logic means performs the following reasoning. If both the present position error $e(t)$ and the present error rate $\dot{e}(t)$ have the same sign, then it is obvious that a correcting actuating torque must be applied, and the correct polarity torque to be applied is determined by the sign of the present position error $e(t)$. This decision is identical to that employed in the analog system previously described. In the situation depicted in FIGURE 2, however, the present position error $e(t_n)$ obtained by the difference $(Rt_n-Ct_n)$ is positive, and the present error rate $\dot{e}(t_n)$ obtained from the difference $(\dot{R}t_n-\dot{C}t_n)$ is negative. It is, therefore, obvious that prediction is required, and to start things off a negative polarity $-Mt_n$ is chosen.

*Step #2.*—With a negative polarity for the actuating torque $-M(t)$, the predicted position error $e(t_f)$ continues positive and the predicted error rate $\dot{e}(t_f)$ continues negative until time $t_n+3T$ is reached where, as shown at point $a$, the predicted future velocity $\dot{C}(t_f)$ changes polarity with a continued negative polarity actuating torque $-M(t)$. Accordingly, it can be appreciated that if the negative actuating torque $-M(t)$ were continued beyond time $t_n+3T$, the positive velocity difference will become greater, hence indicating that at time $t_n$ the choice for the polarity of the actuating torque $V_m$ should not be $-M(t)$ but $+M(t)$.

*Step #3.*—At the time $t_n$, the choice for the polarity of the actuating torque should be $+M(t)$ so that the actual controlled device will go from point $b$ to point $c$ where the prediction process is again carried out for the new set of conditions there prevailing.

*Step #4.*—The prediction process will then be carried out for points $t_n+1T$, $t_n+2T$, etc., until it is indicated that coincidence with the reference line will occur at some future point in time $(t_n+t_f)$. Upon this occasion, the controlled device is switched from a positive actuating torque $+M(t)$ to a negative actuating torque $-M(t)$.

Figure 11:
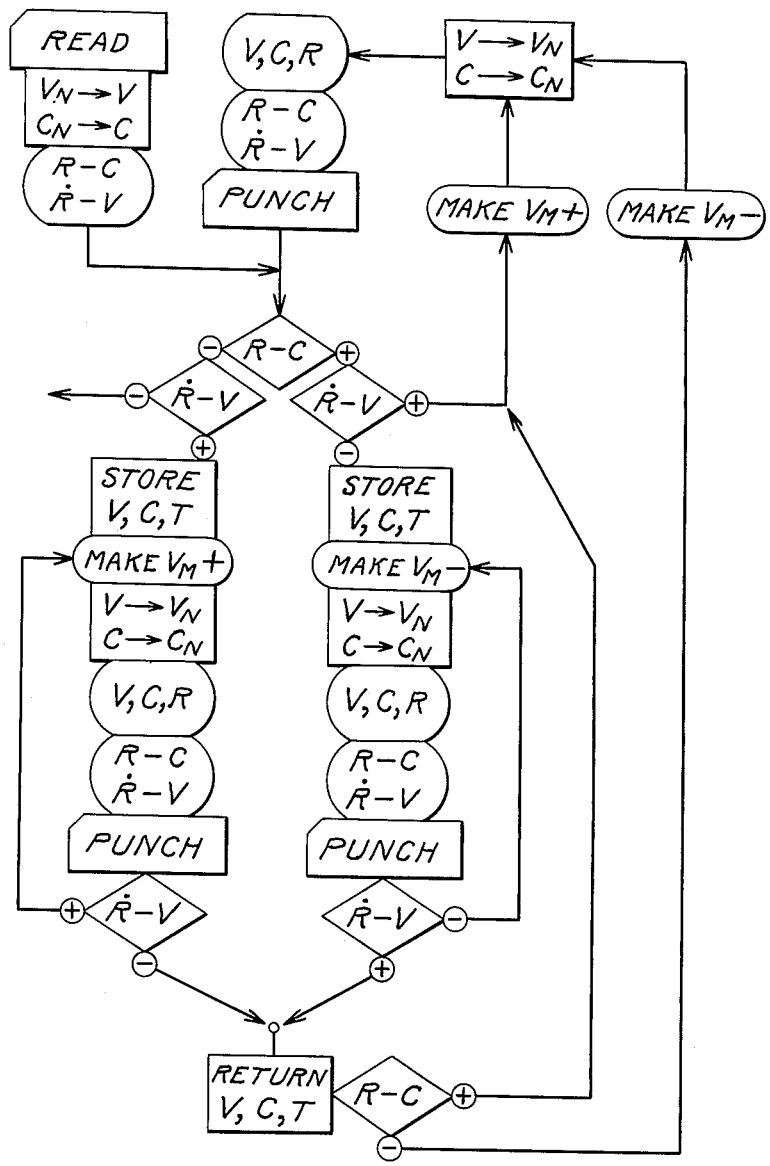
FIGURE 11 is a digital logic flow diagram for the predictive control system shown in FIGURE 9.

The computer program for carrying out the logic outlined above with an IBM 705 computer is shown in FIGURE 11 of the drawings. It should be noted that the programming steps for the computer with the transfer function of the position controlled device is not spelled out in detail, since such programming steps are conventional in nature and are not deemed to require elaboration. The steps of the computation program illustrated in FIGURE 11 are numbered, and are described with corresponding numbers set forth below:

(1) Read into the computer the initial values for $V_m$, $V_n$, $C_n$, $R_n$, $\dot{R}_n$, $T_M$, $T$ and $n=0$ as well as the maximum time allowed for the computation to run.

(2) $V_n$ and $C_n$ are stored in V and C respectively to be used for starting values of the calculations.

(3) The differences $[R-C]_{n=0}$ and $[\dot{R}-\dot{C}]_{n=0}$ are calculated to start the decision process.

(4) The values of V, C, and R for the general case are calculated for the time $t_n$, using the values $V_{t_{n=1}}$ $C_{t_{n-1}}$ and $R_{t_{n-1}}$, and the following equations:

$$R_{t_n+t_f} = R(nt) + \dot{R}_{nf}(f_t) \qquad (2)$$

$$V = \pm V_M - (\pm V_M - V_n)e^{-t1/TM} \qquad (6)$$

and $$C = \pm V_M t^1 - T_M(\pm V_M - V_n)(1 - e^{-t1/TM}) + C_n \qquad (7)$$

The sign to be used for $V_M$ in Equations 6 and 7 has been previously determined at the preceding time $$t_{n-1} = (n-1)T$$

(5) The differences $[R-C]_{t_n}$ and $[\dot{R}-\dot{C}]_{t_n}$ are calculated.

(6) A card is punched containing in order the following information: The identification $nT$ plus or minus $V_M$ depending upon which was used $V_{t_n}$, $C_{t_n}$, $[R-C]_{t_n}$ and $[\dot{R}-\dot{C}]_{t_n}$ and $f$ obtained from Steps #8 or #18 for the previous time $t_{n-1}$.

(7) A test is now made of the sign of $[R-C]_{t_n}$ obtained from Steps #3 or #5. If $[R-C]_{t_n}$ is positive, the next step is #8. If $[R-C]_{t_n}$ is negative, the next step is #9.

(8) With $[R-C]_{t_n}$ positive, next test the sign of $[\dot{R}-\dot{C}]_{t_n}$. If this is positive, then $+V_M$ should be used in Step #10. If $[\dot{R}-\dot{C}]$ is negative, an attempt should be made trying $-V_M$ at Step #13. It should be noted that in Step #8, where it is determined that $+V_M$ would be used in Step #10, that this is a valid determination for the polarity of the actuating torque, and $+M(t)$ will be applied to the actual control device by the system at this point in time $t_n$.

(9) With $[R-C]_{t_n}$ negative, next test the sign of $[\dot{R}-\dot{C}]_{t_n}$. If this is negative, then $-V_M$ should be used for Step #11. If $[R-C]_{t_n}$ is positive, an attempt should be made trying $+V_M$ at Step #14. It should be noted that in Step #9, where it is determined to use $-V_M$, this is a valid determination for the polarity of the actuating torque $-M(t)$ to be applied to the actual control device at this particular point in time $t_n$.

(10) The positive polarity sign (+) is chosen for $V_M$ for use in Step #4.

(11) The negative polarity sign (−) is chosen for $V_M$ for use in Step #4.

(12) V and C of $t_n$ are stored in $V_n$ and $C_n$, respectively, to be used in the calculation of Step #4 for the new V and C at the point $t_{n+1}$.

(13) An attempt is made trying $-V_M$ for the next point. It is necessary to store the present $V_{t_n}$, $C_{t_n}$ and $t_n$ since this is only a trial calculation.

(14) Basically the same operations are carried out as Step #13 except that a $+V_M$ is tried.

(15) Carrying through from Step #13, a test is now made of the sign $[\dot{R}-\dot{C}]_{t_n+t_f}$. If this sign is negative, another trial is made with the next steps being Steps #11, 12, 4, etc. until again at 15 the sign of $[\dot{R}-\dot{C}]_{t_n+t_f}$ is again tested. This cycle is again repeated until the value $[\dot{R}-\dot{C}]_{t_n+t_f}$ becomes positive, and the operation then goes to #17.

(16) This is a carry through of Step #14, and is similar to Step #15 except that the opposite sign of the value $[\dot{R}-\dot{C}]_{t_n+t_f}$ is applicable.

(17) Return to the values of $V_{t_n}$, $C_{t_n}$ and $t_n$ which were stored in Steps #13 or #14.

(18) Check the sign of the value $[R-C]_{t_n+t_f}$. If the sign of this value is negative, use $-V_M$. If the sign of this value is positive use $+V_M$. The processing starting with Step #4 then proceeds on to the next interval of time from $t_n$ to $t_{n+1}$ and the operation is carried out for the next interval of time. Since a period of time is required to carry out the above calculations, it is necessary to calculate only within the calculation intervals of T length.

Figure 12:
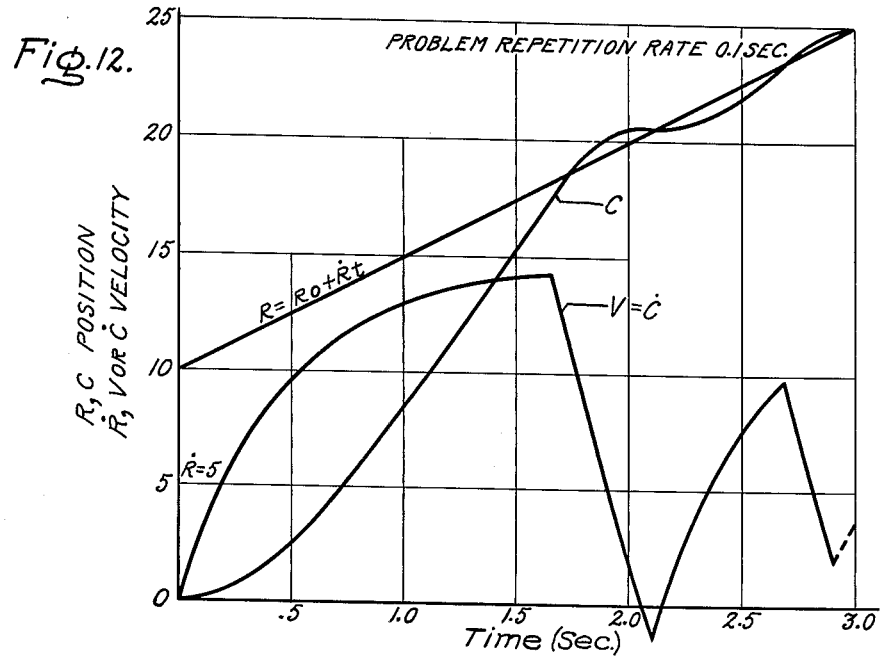
FIGURE 12 is a position and velocity versus time characteristic curve for the predictive control system shown in FIGURE 9, and illustrates the performance of the system for a given set of operating parameters.

In order to implement the digital predictive control system illustrated in FIGURE 9, an IBM 650 Digital Computer was programmed with the following initial conditions:

$R_n = 10$ degrees
$\dot{R}_n$ is equal 5 degrees per second
$C_n = 0$
$V_n = 0$ $T_n = \dfrac{J}{d}$ is equal to 5/10 of a second $V_m = \dfrac{M}{d}$ is equal 15 degrees per second Using the above values of parameters and initial conditions, FIGURE 12 shows a plot of the reference and controlled device positions and velocities plotted as a function of time with a sampling period $T=1/10$ of a second. As can be determined from the examination of FIGURE 12, the velocity of the position control device rises exponentially toward the value of the reference speed until at a point of about 1.7 seconds overshoot appears eminent. At this point the polarity of the actuating torque $V_M$ is reversed, and the velocity of the position control device is thereby reduced until it falls below the reference speed. In the interim period, the position of the control device has overshot the reference position, and, as a consequence, a very low frequency oscillation of about one cycle per second of both the control device position and its velocity results.

Figure 13:
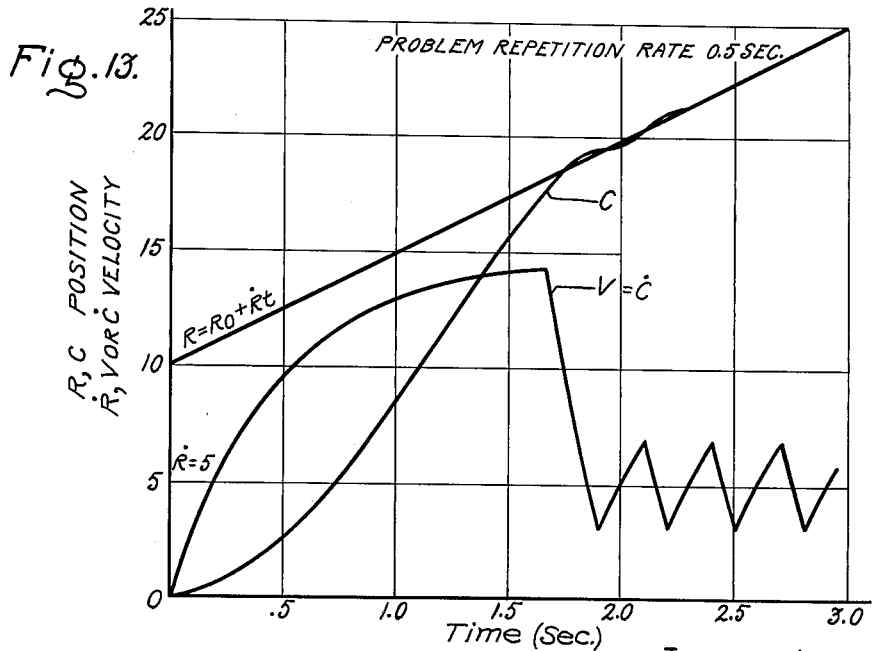
FIGURE 13 is a position and velocity versus time characteristic curve for the predictive control system shown in FIGURE 9 having its sampling rate altered to provide a different response period.

FIGURE 13 shows a plot of the reference and controlled device position and velocities as a function of time for the above conditions with a sampling period $T=$ to .05 second just half as long as the sampling period used with the plot shown in FIGURE 12. The effect of decreasing this sampling period T is to reduce appreciably the amount of position overshoot, and the magnitude of the position oscillation around the reference position. Similarly, the velocity of the position control device for the shorter sampling period shows a much smaller amplitude variation from the reference velocity, and a higher frequency of oscillation than was noted in the example plotted in FIGURE 12 of the drawings.

Figure 14A:
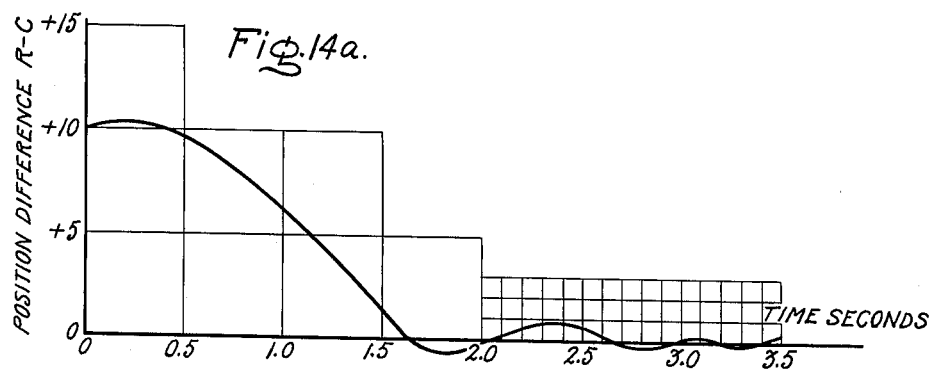
FIGURE 14A shows a position difference versus time characteristic plot for the predictive control system of FIGURE 9 operating under the same conditions used to obtain the operating characteristics shown in FIGURE 12.
Figure 14B:
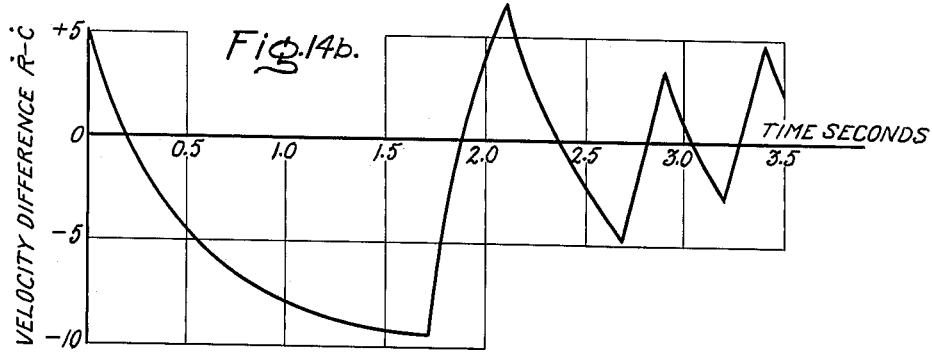
FIGURE 14B illustrates the velocity difference versus time characteristic of the predictive control system for the operating conditions of FIGURE 12.
Figure 15A:
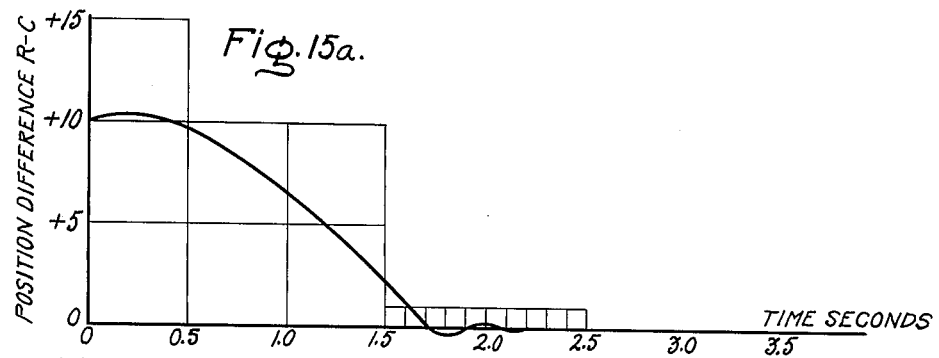
FIGURES 15A and 15B are a series of position error versus time and velocity error versus time plots similar to those shown in FIGURES 14A and 14B, respectively, but are plotted for the different sampling repetition rate illustrated in FIGURE 13.
Figure 15B:
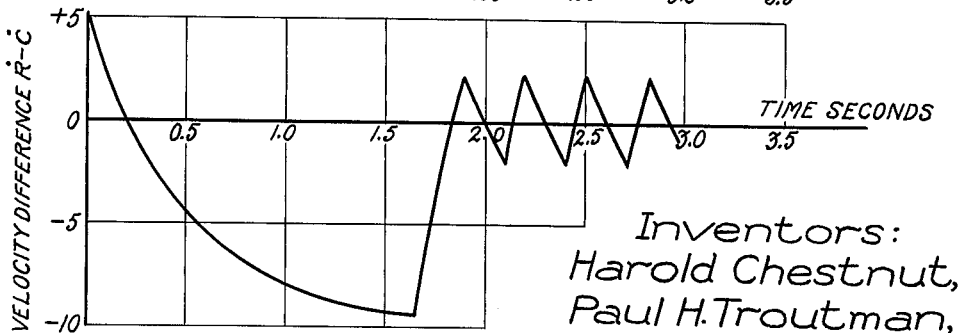

FIGURE 14 of the drawings shows a plot of the position difference $[R-C]$ versus time in FIGURE 14A for a sampling period T of 1/10 of a second. FIGURE 14B shows the velocity difference [Ṙ—Ċ] plotted against time for the same conditions as shown in FIGURE 12 with the sampling period T=to 1/10 of a second. Because of the ability of the position control device to slow down faster than it can speed up, the position difference and velocity difference curves are unsymmetrical with respect to the positive and negative differences. FIGURE 15 shows the same plots as illustrated in FIGURE 14 with a sampling rate of T=to .05 second. As can be determined from an examination of FIGURES 15A and 15B, the maximum value of the error [R—C] is reduced appreciably from its previous value when the sampling rate was T=to 1/10 of a second. Similarly, the velocity difference is, likewise, considerably improved when the sampling rate T is reduced to .05 second. Further, it should be noted that the frequency of oscillation has been raised by decreasing the sampling rate T. However, since a finite time is required to carry out the prediction calculation for the position and velocity differences, it is believed that there is a limit to the improvement in the performance that can be realized by further decreasing the sampling rate T.

From the foregoing description it can be appreciated that the invention provides a new and improved predictive control system which bases its prediction intervals on the prediction error rate passing through zero, and, hence, as the error rate approaches zero the frequency of predictions increases proportionally to provide maximum opportunity for synchronization with little opportunity for overshoot. Further, it can be appreciated that the new and improved predictive control system is designed in a manner where predictions are always in a direction to reduce the predictive future error rate towards zero, thereby assuring that all predictions will be effective in achieving synchronization with a desired reference. Further, by appropriate manipulation of the transfer function used in the model system employed in the predictive control system, it is possible to compensate for movement of the actual control device during the finite period of time required for the predictive calculations to be carried out, and thereby assure that actuation of the control device occurs at optimum periods of time.

Having described two embodiments of a new and improved predictive control system constructed in accordance with the invention, it is believed obvious that other modifications and variations of the present invention are possible in the light of the above teachings. It is, therefore, to be understood that changes may be made in the particular embodiments of the invention described which are within the full intended scope of the invention as defined by the appended claims.

What we claim as new and desire to secure by Letters Patent of the United States is:

1. A predictive control system for a variable controlled device comprising fast-time model means of the controlled device having characteristics substantially similar to the characteristics of the variable controlled device but operating on a fast-time basis, control means for applying a controlling signal to the controlled device and to said fast-time model for controlling the output thereof, the fast-time model means including first prediction means for developing signals representing the predicted future values for the output of the controlled device and the rate of the controlled device at some point in time in the future, reference signal generating means for developing a reference signal representing the desired output with respect to time of the variable controlled device, reference signal prediction means operating on a fast-time basis coupled to said reference signal generating means for developing signals representing the predicted future values for the reference output and the reference rate at some point in time in the future, control logic means operatively coupled to the outputs of the fast-time model and the reference prediction means and to the input of the control means for comparing the future values of the output of the variable controlled device and the reference and the future values of the rate of the variable controlled device and the reference rate and deriving control signals representative of the future error and future error rate for controlling the operation of the control means, and resetting means operatively coupled to said fast-time model means for resetting the predictive operation of the prediction means each time the predicted error rate signal reaches zero to thereby initiate a new prediction based on the new present state condition of the variable controlled device, each of said means being distinct and separate from each of the other said means.

2. The combination set forth in claim 1 wherein said control logic means includes means for sensing a change in polarity of the predicted future output error signal, and means for actuating the control means at the point in the output of the variable controlled device where the predicted future output error signal reversed polarity.

3. The combination set forth in claim 1 wherein said control logic means includes means for sensing a change in polarity of the predicted future output error signal, means for actuating the control means at the point in the output of the variable controlled device where the predicted future output error signal reversed polarity, and means for actuating the resetting means subsequent to said control means being actuated to initiate a new prediction based on the new present state condition of the variable control device with the new prediction being in a direction to reduce the predicted future error rate signal towards zero.

4. The combination set forth in claim 1 wherein said control logic means includes means for sensing a change in polarity of the predicted future output error signal, means for actuating the control means each time the predicted future output error signal reverses polarity at the point in the actual output of the variable controlled device where the predicted future output error signal reversed polarity, and means for actuating the resetting means each time the control means is actuated to thereby initiate a new prediction after each actuation of the control means based on the new present state condition of the variable control device with each new prediction being in a direction to reduce the predicted future error rate signal towards zero.

5. The combination set forth in claim 1 wherein the fast-time model means is compensated in its speed of response to allow for movement of the actual variable controlled device during the prediction period.

6. The combination set forth in claim 1 wherein the fast-time model means is compensated in its speed of response to allow for movement of the actual variable controlled device during the prediction period, and wherein the control logic means includes means for sensing a change in polarity of the predicted future output error signal, and means for actuating the control means at the point in the actual output of the variable controlled device where the predicted future output error signal reversed polarity.

7. The combination set forth in claim 1 wherein the fast-time model means is compensated in its speed of response to allow for movement of the actual variable controlled device during the prediction period, and wherein the control logic means includes means for sensing a change in polarity of the predicted future output error signal, means for actuating the control means at the point in the actual output of the variable controlled device where the predicted future output error signal reversed polarity, and means for actuating the resetting means subsequent to said control means being actuated to initiate a new prediction based on the new present state condition of the control device with the new prediction being in a direction to reduce the predicted future error rate signal towards zero.

8. The combination set forth in claim 1 wherein the fast-time model means is compensated in its speed of response to allow for movement of the actual variable controlled device during the prediction period, and wherein the control logic means includes means for sensing a change in polarity of the predicted future error signal, means for actuating the control means each time the predicted future output error signal reverses polarity at the point in the actual output of the variable controlled device where the predicted future output error signal reversed polarity, and means for actuating the resetting means each time the control means is actuated to thereby initiate a new prediction after each actuation of the control means based on the new present state condition of the variable control device with each new prediction being in a direction to reduce the predicted future error rate signal towards zero.

9. A predictive control system for a variable controlled device comprising fast-time model means of the controlled device having characteristics substantially similar to the characteristics of the variable controlled device but operating on a fast-time basis, control means for applying a controlling signal to said variable controlled device and to said fast-time model means for controlling the operation thereof, said fast-time model including first prediction means for developing signals representing the predicted future values for the position of the variable controlled device and the velocity of the controlled device at some selected point in time in the future, reference signal generating means for developing a reference signal representing the desired position with respect to time of the variable controlled device, reference signal prediction means coupled to said reference signal generating means for developing signals representing the predicted future values for the reference position and the reference velocity at some selected interval of time in the future, control logic means coupled to the outputs of the first prediction means and the reference prediction circuit means and to the input of the control means for comparing the future values of the position of the controlled device and the reference position and the future values of the velocity of the controlled device and the reference velocity and deriving output signals representative of the future position error and future error rate for controlling the operation of the control means, and resetting means operatively coupled to said fast-time model means for resetting the predictive operation of said prediction means each time the predicted error rate signal reaches zero to thereby initiate a new prediction based on the new present state condition of the variable control device, each of said means being distinct and separate from each of the other said means.

10. The combination set forth in claim 9 wherein said control logic means includes means for sensing a change in polarity of the predicted future position error signal, and means for actuating the control means at the point in the actual position of the variable controlled device where the predicted future error signal reversed polarity.

11. The combination set forth in claim 9 wherein the fast-time model means is compensated in its speed of response to allow for movement of the actual variable position controlled device during the prediction period, and wherein the control logic means includes means for sensing a change in polarity of the predicted future position error signal, means for actuating the control means at the point in the actual position of the variable controlled device where the predicted future position error signal reversed polarity, and means for actuating the resetting means subsequent to said control means being actuated to initiate a new prediction based on the new present state condition of the variable controlled device with the new prediction being in a direction to reduce the predicted future error rate signal towards zero.

12. The combination set forth in claim 9 wherein said control logic means includes means for sensing a change in polarity of the predicted future position error signal, means for actuating the control means each time the predicted future error signal reverses polarity at the point in the actual position of the variable controlled device where the predicted future position error signal reversed polarity, and means for actuating the resetting means each time the control means is actuated to thereby initiate a new prediction after each actuation of the control means based on the new present state condition of the variable control device with each new prediction being in a direction to reduce the predicted future error rate signal towards zero.

13. A predictive control system for a variable controlled device including in combination means for deriving signals representative of the present position and present rate of change of the variable controlled device, a fast-time model means of the controlled device having a transfer function similar to that of the controlled device, but operating on a fast-time basis, selectively operable switching means for operatively coupling the present position signal and the present rate of change signal to the fast-time model to initiate a prediction operation which generates signals having values proportional to a predicted future position and a predicted future rate of change at said future position, and actuating means operatively coupled to the fast-time model means and to the selectively operable switching means for actuating the switching means in response to said predicted rate of change signal of the fast-time model means passing through zero, each of said means being distinct and separate from each of the other said means.

14. A predictive control system for a variable controlled device including in combination a controller for controlling operation of the controlled device, means for deriving signals representative of the present position and present rate of change of the controlled device, a fast-time model means of the controlled device having a transfer function similar to that of the controlled device but operating on a fast-time basis which generates signals having values proportional to a predicted future position and a predicted future rate of change at said future position, a selective switching means operatively coupled to and controlled by said fast-time model means for applying the present position signal and the present rate of change signal to the fast-time model means each time said predicted rate of change signal of the fast-time model means passes through zero to thereby initiate a new prediction operation, and circuit means operatively coupled to the output of said fast-time model and to said controller for deriving a corrective signal that is supplied to the controller to cause the controlled device to achieve a desired operating condition in response to the predictions of the fast-time model means, each of said means being distinct and separate from each of the other said means.

15. The combination set forth in claim 13 wherein the fast-time model is compensated in its speed of response to allow for movement of the variable controlled device during the prediction period.

16. The combination set forth in claim 14 wherein the fast-time model is compensated in its speed of response to allow for movement of the variable controlled device during the prediction period.

References Cited by the Examiner
UNITED STATES PATENTS

| 2,712,414 | 7/1955 | Ziebolz et al. | 235—151 |
| 2,842,311 | 7/1958 | Petrie | 235—151 |
| 2,983,859 | 5/1961 | Coales et al. | 235—184 X |
| 3,059,880 | 10/1962 | Buxton | 244—77 |

OTHER REFERENCES

Pages 129–136, June 1957, Phister et al., "Fitting the Digital Computer Into Process Control," Control Engineering.

(Other references on following page)

IBM Electronic Data Processing Machines—Type 705, Preliminary Manual of Operation, 123 pages, 1958.

References Cited by the Applicant

UNITED STATES PATENTS 2,983,859  5/1961  Coales et al.

OTHER REFERENCES

Pages 970–976, 1961, "Principles of Model Techniques in Optimizing Control," by Eckman and Lefkowitz, Proc. of the First International Congress of the International Federation of Automatic Control, held in Moscow, U.S.S.R., 1960, pub. by Butterworths-London, vol. II.

Pages 215–233, 1954, Feb. 15, 1954, "Possibilities of a Two-Time Scale Computing System for Control and Simulation of Dynamic Systems," by H. Ziebolz and H. M. Paynter, vol. IX, proceedings of the National Electronics Conference 1953, by the National Electronics Conference, Inc.

MALCOLM A. MORRISON, *Primary Examiner.*